US008314360B2

(12) United States Patent
Grek et al.

(10) Patent No.: US 8,314,360 B2
(45) Date of Patent: Nov. 20, 2012

(54) APPARATUSES AND METHODS FOR IRRADIATING A SUBSTRATE TO AVOID SUBSTRATE EDGE DAMAGE

(75) Inventors: Boris Grek, Hayward, CA (US); David A. Markle, Saratoga, CA (US)

(73) Assignee: Ultratech, Inc., San Jose, CA (US)

( * ) Notice: Subject to any disclaimer, the term of this patent is extended or adjusted under 35 U.S.C. 154(b) by 0 days.

(21) Appl. No.: 13/164,700

(22) Filed: Jun. 20, 2011

(65) Prior Publication Data

US 2011/0249071 A1 Oct. 13, 2011

Related U.S. Application Data

(63) Continuation of application No. 12/005,778, filed on Dec. 27, 2007, now abandoned, which is a continuation of application No. 11/447,623, filed on Jun. 6, 2006, now abandoned, which is a continuation-in-part of application No. 11/236,271, filed on Sep. 26, 2005, now Pat. No. 7,238,915.

(51) Int. Cl.
*H01L 21/268* (2006.01)
(52) U.S. Cl. .................................. 219/121.65; 438/487
(58) Field of Classification Search ............ 219/121.65, 219/121.66, 121.8; 438/166, 487
See application file for complete search history.

(56) References Cited

U.S. PATENT DOCUMENTS

| | | | | |
|---|---|---|---|---|
| 3,549,733 A | * | 12/1970 | Caddell | 219/121.82 |
| 4,415,794 A | * | 11/1983 | Delfino et al. | 219/121.8 |
| 6,747,245 B2 | * | 6/2004 | Talwar et al. | 219/121.8 |
| 2002/0137311 A1 | * | 9/2002 | Timans | 438/487 |
| 2003/0109148 A1 | * | 6/2003 | Foad | 438/487 |
| 2004/0065643 A1 | * | 4/2004 | Tanaka | 219/121.8 |
| 2004/0084427 A1 | * | 5/2004 | Talwar et al. | 219/121.8 |
| 2005/0045604 A1 | * | 3/2005 | Talwar et al. | 438/487 |
| 2005/0148208 A1 | * | 7/2005 | Chang et al. | 438/487 |

FOREIGN PATENT DOCUMENTS

| | | | | |
|---|---|---|---|---|
| JP | 56-7438 A | * | 1/1981 | |
| JP | 59-139624 A | * | 8/1984 | |
| JP | 61-230318 A | * | 10/1986 | |
| JP | 62-216321 A | * | 9/1987 | |
| JP | 1-173707 A | * | 7/1989 | |

* cited by examiner

*Primary Examiner* — Geoffrey S Evans
(74) *Attorney, Agent, or Firm* — Allston L. Jones; Peters Verny, LLP

(57) ABSTRACT

Apparatuses and methods are provided for processing a substrate having an upper surface that includes a central region, a peripheral region, and an edge adjacent to the peripheral region. An image having an intensity sufficient to effect thermal processing of the substrate is scanned across the upper surface of the substrate. The image scanning geometry allows processing the central region of the substrate at a substantially uniform temperature without damaging the outer edge. In some instances, the image may be formed from a beam traveling over at least a portion of the central region so that no portion thereof directly illuminates any portion of the edge when the image is scanned across the periphery region. The substrate may be rotated 180° or the beam direction may be switched after part of the scanning operation has been completed.

22 Claims, 16 Drawing Sheets

PRIOR ART

US 8,314,360 B2

APPARATUSES AND METHODS FOR IRRADIATING A SUBSTRATE TO AVOID SUBSTRATE EDGE DAMAGE

CROSS-REFERENCE TO RELATED APPLICATIONS

This patent application is a continuation of U.S. patent application Ser. No. 12/005,778 filed Dec. 27, 2007 (now abandoned) which is was continuation of U.S. patent application Ser. No. 11/447,623 filed Jun. 6, 2006 (now abandoned) which was a continuation-in-part of to U.S. patent application Ser. No. 11/236,271 (now U.S. Pat. No. 7,238,915 issued Jul. 3, 2007), entitled "METHODS AND APPARATUS FOR IRRADIATING A SUBSTRATE TO AVOID SUBSTRATE EDGE DAMAGE," (hereinafter, "the '271 patent application"), filed Sep. 26, 2005, the disclosure of which is incorporated by reference herein.

BACKGROUND OF THE INVENTION

1. Field of the Invention

The present invention relates to the thermal processing of a substrate, and in particular relates to methods and apparatus for irradiating a substrate in a manner that avoids damaging an edge of the substrate.

2. Description of Background Art

Laser thermal processing (LTP), also known more generally as rapid thermal processing (RTP), is a technique for manufacturing semiconductor devices such as integrated circuits (IC). LTP involves irradiating a substrate with a localized beam of intense radiation to bring the substrate surface from a relatively low temperature (e.g., 400° C.) to a relatively high temperature (e.g., 1,200° C.) quickly so that the substrate bulk can pull the temperature down quickly.

LTP may be used to activate dopants in source/drain regions of transistors formed in a silicon wafer. The source/drain regions are typically formed by exposing areas of a silicon wafer to an electro-statically accelerated ion beam containing boron, phosphorous or arsenic ions. After implantation, the dopant atoms are largely interstitial, do not form part of the silicon crystal lattice, and are electrically inactive. Activation of these dopant atoms may be achieved by raising the substrate temperature high enough and for a period of time long enough for the crystal lattice to incorporate the impurity atoms. The optimum length of time depends on the maximum temperature. However, during the activation thermal cycle, the impurities tend to diffuse throughout the lattice causing the distribution to change from one approximating an ideal step profile achieved during implant to a profile having a shallow exponential fall-off after a long annealing cycle.

By employing higher annealing temperatures and shorter annealing times, it is possible to reduce dopant diffusion and retain the abrupt step-shaped dopant distribution achieved after the implant step. The continuous reduction in transistor feature sizes has lead to a process called Laser Spike Annealing (LSA), which employs a $CO_2$ laser beam formed into a long, thin image that is raster scanned across the wafer. In a typical configuration, a 0.1 mm wide beam is scanned at 100 mm/s over the wafer surface to produce a 1 millisecond dwell time for the annealing cycle. A typical maximum temperature during this annealing cycle might be ~1350° C. In the 1 millisecond time it takes to bring the wafer surface up to the annealing temperature, only about 100-200 micrometers of material nearest the upper surface is heated. Consequently, the bulk of the 800 micrometer thick wafer serves to cool the irradiated surface almost as quickly as it was heated once the laser beam moves past.

A wafer that has been processed to the point where it is ready for the annealing step typically contains a number of thin film structures such as gates, poly-silicon runners and pads, and oxide isolation trenches. These structures may be superimposed. The distribution of these structures varies from region to region across a circuit, depending on the function of a particular area of the circuit. Typically, the reflectivity of the circuit varies depending on the proportion of the various structures present in a given region. This leads to substantial variations in the proportion of the laser beam energy absorbed in any area and thus uneven heating.

In some cases, even a 5° C. variation in the maximum annealing temperature can lead to observable performance differences for the circuits being annealed. This temperature variation may correspond to a variation of less than 0.5% in the absorption coefficient of the product wafer surface. A minimum variation in absorption can be achieved by using P-polarized radiation incident on the substrate at or near the Brewster angle. P-polarized radiation incident on an undoped silicon surface is completely absorbed at the Brewster angle. In the case of a patterned wafer, the Brewster angle refers to the angle of minimum or near-minimum reflectivity of P-polarized light averaged over a surface. Strictly speaking, films on the surface of an object such as silicon wafer, or electrically active dopants in the silicon prevent it from having a true Brewster angle. Accordingly, the Brewster angle as used herein for a specular surface formed from a variety of different films stacked on a substrate (as is the case for a product IC wafer) can be thought of as an effective Brewster angle, or the angle at which the reflectivity of P-polarized radiation is at a minimum on average. This minimum angle typically coincides with or is near the angle of the true Brewster angle for the (bare) substrate.

A further reduction in reflectivity variation can be achieved by using wavelengths that are large compared to the device structures on the wafer. This condition may be met with the 10.6 micrometer, $CO_2$ laser. The Brewster angle for bare silicon at 10.6 micrometers is about 75° from normal incidence.

FIG. 1 is a schematic side view of an exemplary LTP geometry involving a substrate 10 with an upper surface 12 with an associated surface normal N12. Substrate 10 includes an outer edge 14 with an associated edge normal N14. Unlike surface normal N12, whose direction is the same for points on the upper surface, the edge normal N14 varies in direction as a function of the polar angle φ (see FIG. 4) in the X-Y plane.

Substrate 10 includes a narrow annular peripheral region 18 of width $W_E$ (FIG. 4) that runs around the upper surface 12 adjacent outer edge 14. Region 18 is located between the substrate edge and the central region 19. In some instances, the central region represents a portion of the substrate where full yield is expected when producing semiconductor devices such as integrated circuits and the peripheral region represents an edge exclusion region, a portion of the substrate in which yield is not expected and sometimes where no device or portion thereof lies. Substrate 10 is shown being irradiated with a radiation beam 20 that performs LTP of the substrate by scanning the beam over the upper surface. Radiation beam 20 is incident upon substrate upper surface 12 at a surface incident angle θ with respect to surface normal N12. Surface incident angle θ may be, for example the (effective) Brewster angle for the substrate. The intensity I(θ) of radiation beam 20 at substrate surface 12 is given by $I(\theta)=I_0 \cos(\theta)$, wherein $I_0$ is the baseline radiation intensity measured normal to the radiation beam.

When irradiating the substrate at a high incident angle $\theta$ (e.g., ~75°) with scanned radiation beam 20, distal substrate edge 14 on the far side FS (relative to the incident direction of the radiation beam) never sees the incident radiation beam, even when the beam moves from position A to position B. However, proximal substrate edge 14 on side NS is prone to exposure by radiation beam 20 when the beam is in position A. Further, radiation beam 20 makes an incident angle $\psi$ with respect to edge normal N14, wherein $\psi=90°-\theta$ when $\phi=0°$. Thus, if $\theta=75°$, then $\psi=15°$. Accordingly, if radiation beam is in position A, the intensity I at the near side substrate edge 14 is approximately 3.73 times greater than the intensity at surface 12. This can raise the near-side substrate edge temperature to a level sufficient to damage (e.g., form fractures 30) in the substrate at the substrate edge.

At first glance, it might appear that this problem is easily solved—for example, by simply blocking the portion of radiation beam 20 that strikes wafer edge 14. However, when radiation beam 20 is coherent, as is typically the case for LTP or other irradiative processes requiring a high-power beam, a baffle that blocks a portion of the radiation beam before it reaches substrate edge 14 on near side NS, also diffracts the radiation beam. The diffracted radiation interferes constructively or destructively with the portion of the beam directly incident on the substrate, depending on the position. This causes some portions of the regions on substrate surface 12 to be overexposed while other regions are underexposed. The variation in exposure caused by diffraction can be as high as 20% or more. Thus, any attempt to block the beam from striking the substrate edge results in an unacceptable non-uniformity at the substrate surface that extends well beyond region 18, making this shielding approach an untenable solution. Simply turning the radiation beam off and on as it approaches and recedes from the wafer edge may not be particularly effective either. Typically the edge exclusion region 18 is narrower than the length of the radiation beam, so at some positions along the wafer edge the laser beam straddles the exclusion zone extending from the edge to the high yield region on the wafer. Typically the exclusion zone might be 3 mm wide, while the radiation beam 20 has a typical length of 6 to 10 mm. Thus, a linear scan of substrate surface 12 near edge 14 results in either some of the edge being directly exposed by the beam, or the beam being turned off before all of the desired area of the substrate surface has been exposed.

A number of approaches may be employed to overcome the edge exposure problem. U.S. patent application Ser. No. 11/040,739, entitled "METHODS AND APPARATUS FOR TRUNCATING AN IMAGE FORMED WITH COHERENT RADIATION," (hereinafter, "the '739 patent application"), filed Jan. 21, 2005, for example, describes a solution to the edge exposure problem. The '739 patent application describes an optical system that includes, in place of a baffle as discussed above, an anamorphic relay, an apodized aperture, and a vignetting edge. The edge moves in synchronism with a scanned beam scan so as to truncate the beam and the beam image formed thereby. This approach is generally considered complex in nature and may be difficult to implement.

Similarly, the '271 patent application describes another solution to the edge exposure problem. Instead of being truncated, the radiation beam is scanned over a scan path so that any intersection of the radiation beam with the substrate edge meets or exceeds a scan path critical (SPC) angle. The SPC angle corresponds to an edge position where the scanned beam would produce a substrate edge temperature that is substantially the same as a substrate surface temperature when the substrate is irradiated. This solution requires that the beam image intensity profile along the length of the image make a transition from an intensity that does no edge damage to an intensity useful for annealing in a distance corresponding to something less than the edge exclusion width. This avoids any need to modulate the laser power, which is not recommended for high power $CO_2$ lasers, but the constraints on the beam profile can prove to be onerous.

Thus, there exist opportunities to provide alternative and/or improved solutions to the edge exposure problem. In particular, there is a need to provide alternative and/or improved solutions to the edge exposure problem that do not require an exclusion zone to be defined on the substrate surface and/or an arcuate scan.

SUMMARY OF THE INVENTION

In a first aspect, an apparatus is provided for processing a substrate having an upper surface that includes a central region, a peripheral region and an edge adjacent to the peripheral region. The apparatus includes a radiation source adapted to emit radiation and an optical system adapted to receive the emitted radiation and create therefrom a radiation beam that is imaged on the upper surface of the substrate at an incident angle. The apparatus also includes a stage adapted to support the substrate and a controller operably coupled to the radiation source and the stage. The controller is programmed to scan the image across at least the substrate surface in manner effective to process the substrate at a substantially uniform temperature without overheating the edge, i.e., heating the edge to a temperature that damages the edge.

To provide relative movement between the stage and the beam to effect scanning, the stage is typically movable while the radiation source and the optical system remain immobile. The stage may be constructed for rotational and translational motion. Optionally, the wafer can remain immobile and the beam image can be scanned across the substrate.

In another aspect, a method for processing a substrate as described above is provided. The method involves forming an image from a radiation beam incident the upper surface of the substrate with an intensity sufficient to effect thermal processing of the substrate. The image is scanned across at least the central region of the substrate periphery region in a manner effective to process the substrate at a substantially uniform temperature without overheating the outer edge to a temperature that damages the edge.

When the edge is perpendicular to the upper surface, the invention is particularly useful in instances wherein the beam irradiates the substrate surface at an incident angle greater than 45°. Often, the incident angle is at or near the Brewster angle of the upper surface of substrate. The Brewster angle for Si substrates, for example, is about 75°.

The invention may be carried out using any of a number of scan paths and/or geometries. For example, the image may be scanned so no portion thereof directly illuminates any portion of the edge. In the alternative, if the image does illuminate an edge, the incidence angle is sufficiently high to avoid edge damage. This condition may occur, for example, when the portion of the substrate having an edge facing away from the beam direction is scanned. Once this portion has been processed, the substrate may be rotated 180° about an axis normal to the upper surface thereof and the scanning repeated to process the remaining portion. Such rotation may occur during thermal processing of the substrate surface and/or after a substantial portion of the upper surface of the substrate is thermally processed. In any case, substantially all of the substrate surface may be processed thermally, without any edges being exposed to a nearly normal incident beam.

Thus, in another aspect, the invention provides a method for processing a substrate having an upper surface, an edge adjacent to the upper surface, and a beam incident on the upper surface at an angle. The method involves forming an image at an intensity sufficient to effect thermal processing of the substrate from a radiation beam and scanning the image across the portion of the surface having an edge that faces away from the beam direction. After the substrate is rotated so the relative positions of the portions of the surface having edges facing the beam and facing away from the beam are transposed, the scanning is repeated on the portion of the substrate having an edge facing away from the incident beam. As a result, the scanned regions can be made to include substantially all of the upper surface of the substrate, which may be processed at a substantially uniform temperature without overheating any point along the entire edge.

Figure 1:
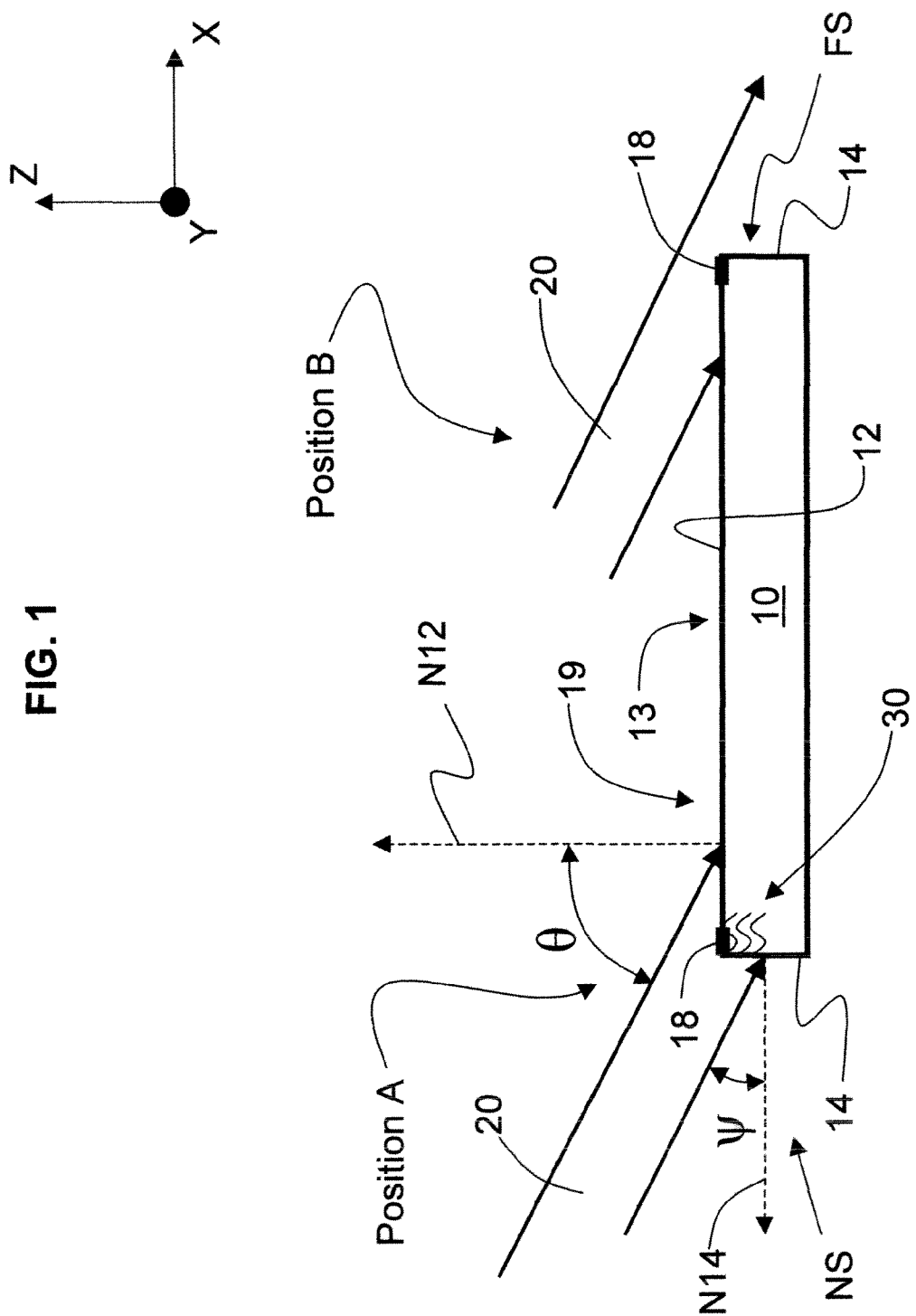
FIG. 1 is a side view of a substrate, such as a semiconductor wafer, being irradiated by a radiation beam at an incident angle relative to the surface normal while performing LTP, illustrating how the radiation beam irradiates and damages the near side substrate edge while in position A due to the intense heating of the substrate edge with no edge damage occurring at position B where the edge is facing away from the beam direction.

The various elements depicted in the drawings are merely representational and are not necessarily drawn to scale. Certain proportions thereof may be exaggerated, while others may be minimized for clarity of presentation. The drawings are intended to illustrate various implementations of the invention, which can be understood and appropriately carried out by those of ordinary skill in the art.

DETAILED DESCRIPTION OF THE INVENTION

Definitions and Overview

Before describing the present invention in detail, it is to be understood that this invention, unless otherwise noted, is not limited to specific substrates, temperature measuring means, or materials, as such may vary. It is also to be understood that the terminology used herein is for the purpose of describing particular embodiments only, and is not intended to be limiting.

It must be noted that, as used in this specification and the appended claims, the singular forms "a", "an" and "the" include both singular and plural referents unless the context clearly dictates otherwise. Thus, for example, reference to "beam" includes a plurality of beams as well as a single beam, reference to "a wavelength" includes a range or plurality of wavelengths as well as a single wavelength, reference to "a region" includes a combination of regions as well as single region, and the like.

In describing and claiming the present invention, the following terminology will be used in accordance with the following definitions.

The terms "Brewster's angle" or Brewster angle" is used to refer to the angle of incidence between a radiation beam and a dielectric surface that corresponds to the minimum or near-minimum reflectivity of the P-polarized component of the beam. Films on the surface of an object, such as a silicon wafer, may prevent it from exhibiting zero reflectivity at any angle. If, however, the films are dielectric in nature, then there generally will be an angle of minimum reflectivity for P-polarized radiation. Accordingly, the Brewster's angle as used herein for a specular surface formed from a variety of different dielectric films stacked on a substrate can be thought of as an effective Brewster's angle, or the angle at which the reflectivity of P-polarized radiation is at a minimum. This minimum angle typically coincides with or is near the angle of the Brewster's angle for the substrate material.

The term "intensity profile" in reference to an image or a beam refers to the distribution of radiation intensity along one or more dimensions. For example, an image may have a useful portion and a non-useful portion. The useful portion of an image is that portion having a "uniform" intensity profile near the peak intensity. In other words, the intensity profile integrated in the scan direction throughout the useful portion of the image may be substantially constant. Accordingly, any point on a substrate surface region that is scanned by a useful portion of an image having a uniform intensity profile will be heated to the same temperature. However, the intensity or intensity profile of the non-useful portion may differ from that of the useful portion. Thus, the image as a whole may have an overall "non-uniform" intensity profile even though a portion of the image called the useful portion may exhibit an uniform intensity profile.

As a related matter, the term "peak intensity value" of an image or a beam refers to the point of highest intensity in the image or beam. Typically, the entirety of the useful portion of an image will include the peak intensity.

The term "light emitting photodiode (LED)" refers to a diode that is typically made from semiconductor material, and which converts an applied voltage to photonic radiation. The terms "diode" and "LED" are generally interchangeably used herein, however this is not to be confused with the term "photodiode", which may refer to a photo-detector that converts incident radiation into an electrical current. The term "laser diode" refers to a type of LED that emits coherent light when forward biased.

The term "semiconductor" is used to refer to any of various solid substances having electrical conductivity greater than insulators but less than good conductors, and that may be used as a base material for computer chips and other electronic devices. Semiconductors include elements such as silicon and germanium and compounds such as silicon carbide, aluminum phosphide, gallium arsenide, and indium antimonide. Unless otherwise noted, the term "semiconductor" includes any one or a combination of elemental and compound semiconductors, as well as strained semiconductors, e.g., semiconductors under tension or compression. Exemplary indirect bandgap semiconductors suitable for use with the invention include Si, Ge, and SiC. Direct bandgap semiconductors suitable for use with the invention include, for example, GaAs, GaN, and InP.

The term "specular surface" refers to a surface that is either entirely or substantially flat and reflecting, as opposed to one that is substantially rough and scattering. The criteria involved with specularity of a surface depend on the wavelengths and angles used to measure the properties of the surface.

The terms "substantial" and "substantially" are used in their ordinary sense and refer to matters that are considerable in importance, value, degree, amount, extent or the like. For example, the phrase "substantially Gaussian in shape" refers to a shape that corresponds predominantly to the shape of a Gaussian probability distribution curve. However, a shape that is "substantially Gaussian" may exhibit some characteristics of a non-Gaussian curve as well, e.g., the curve may also include a component described by a polynomial. Similarly, a "substantially uniform" intensity profile will contain a relatively flat portion where the intensity does not deviate more than a few percent from the profile's peak intensity. Preferably, the intensity deviation is less than about 2%. Optimally, the intensity deviation is no more than about 1% or no more than about 0.8%. Other uses of the term "substantially" involve an analogous definition.

The term "substrate" as used herein refers to any material having a surface, which is intended for processing. The substrate may be constructed in any of a number of forms, for example, such as a semiconductor wafer containing an array of chips, etc.

The present invention includes apparatuses, systems and methods for processing a substrate, e.g., a substrate having a circular specular surface bounded by an edge, in a manner that avoids damaging the substrate edge. The apparatus and system of the present invention is described in an example embodiment of an LTP system. Methods of the invention are then described in connection with processing of the substrate using the LTP system by scanning the line image formed by the LTP system over a scan path that satisfies a "safe scan" condition, as described below.

LTP System

Figure 2:
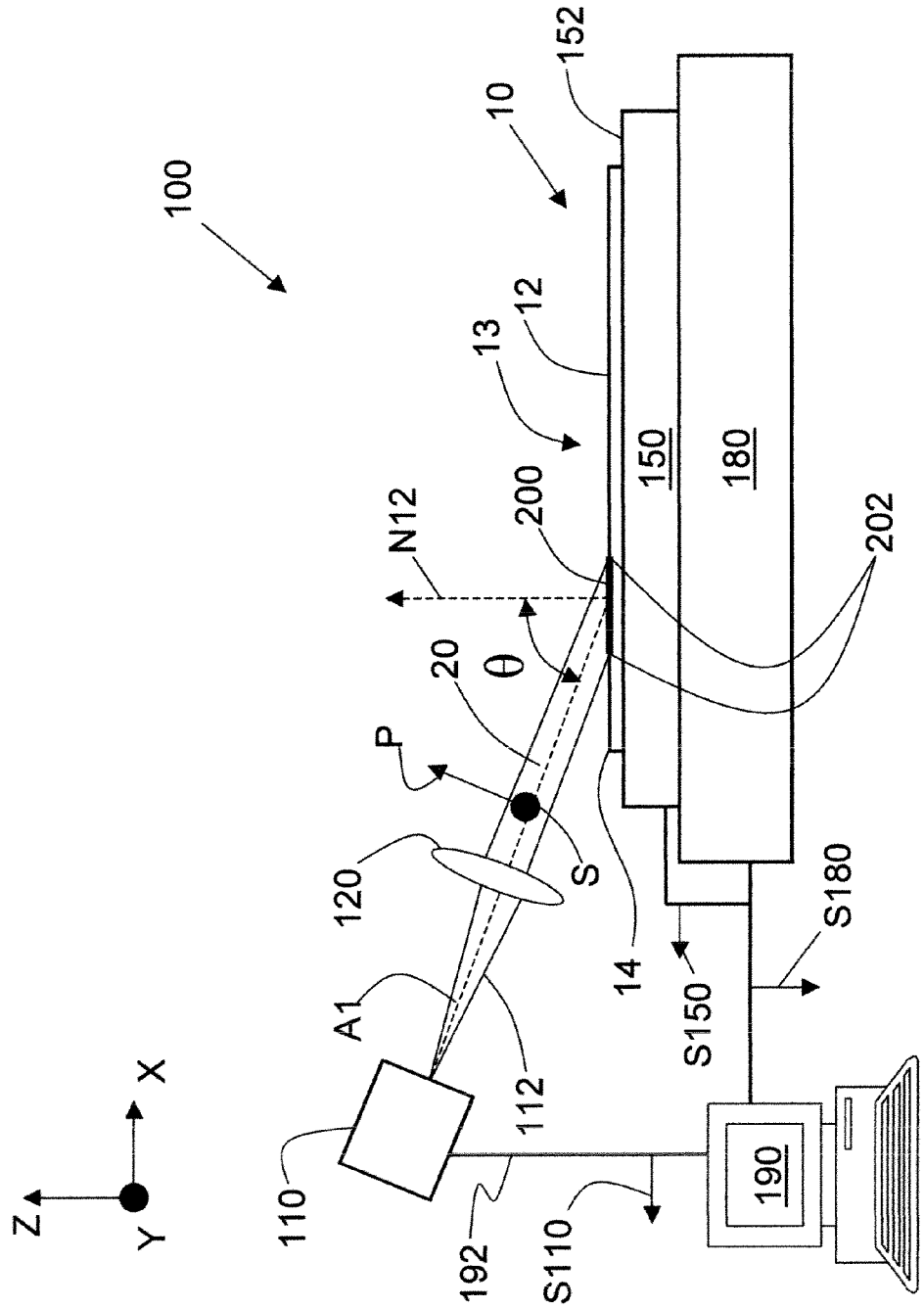
FIG. 2 is a schematic side view of an example embodiment of an LTP system adapted to carry out the methods of the present invention.

FIG. 2 is a schematic diagram of an example embodiment of an LTP system 100. LTP system 100 includes a radiation source 110 that emits radiation 112 along an optical axis A1. An optical system 120 is arranged along optical axis A1 downstream from radiation source 110. Optical system 120 is adapted to receive radiation 112 and form therefrom an LIP radiation beam 20 that travels along optical axis A1. In an example embodiment, radiation source 110 is a laser, such as a $CO_2$ laser. However, LEDs and laser diodes may be used as well. LTP system 100 also includes a substrate chuck unit 150 with an upper surface 152 adapted to support circular substrate 10 with upper surface 12, a center 13 and an edge 14 (FIG. 1). In an example embodiment, substrate 10 is a silicon wafer with doped source and drain regions 182 and 184 (FIG. 3) that need to be thermally activated as part of a process of forming transistors. In addition, substrate 10 includes a narrow annular peripheral region 18 that serves as an exclusion zone which is not expected to yield a device. In an example embodiment, chuck unit 150 is adapted to be heated to 400° C. and is also water cooled so a constant background substrate temperature can be maintained whether or not the laser beam is contributing large amounts of power (e.g., 3000 W) to the substrate and the chuck. Chuck unit 150 is supported by a movable stage 180. Optionally, the chuck and stage may be an integrated piece of equipment. However, the chuck unit does not have to be heated when activation radiation technologies such as those described in U.S. patent application Ser. No. 11/403,704, entitled "APPARATUS AND METHOD FOR PROCESSING A SEMICONDUCTOR SUBSTRATE WITH TEMPERATURE FEEDBACK," inventors Bakeman and Markle, filed on Apr. 13, 2006 are used.

Typically, the stage 180 provides at least translational movement in the X-Y plane. In addition, the stage 180 may provide movement along the Z axis for focusing. Optionally, the stage 180 may provide rotational movement as well. For example, the stage may serve to rotate any substrate supported thereby about the X, Y, and/or Z axes to a degree significantly greater than that required for alignment and/or calibration purposes. In particular, the stage 180 may serve to rotate any substrate about an axis perpendicular to the upper surface 12 of substrate 10. Such rotational movement represents a significant departure from the capability of ordinary LTP systems, and, as discussed below, may be useful in preventing an edge of a substrate from damage during processing as a result of overheating.

A controller 190 is operably coupled to radiation source 110 via an electrical line 192. Controller 190 controls the amount of radiation 112 (and thus the power) emitted by radiation source 110 via a control signal S110 provided to the radiation source by the controller. Controller 190 is also operably coupled to stage 180 and controls the movement of the stage via a stage control signal S180. In an example embodiment, controller 190 is also coupled to chuck 150 and is in operable communication therewith via signals S150 to maintain control of the substrate background temperature.

In an example embodiment, controller 190 is a programmable computer having a processor, such as a field-programmable gate array (FPGA), adaptable to carry out logic operations and cause LTP system 100 to carry out the scanning methods described below.

LTP Method of Operation

With continuing reference to FIG. 2, in the operation of LTP system 100, controller 190 generates control signal S110 and sends it to radiation source 110. In response thereto, radiation source 110 generates radiation 112, which is formed into radiation beam 20 by optical system 120. In an example embodiment, radiation beam 20 has a substantially Gaussian profile and is formed into a long, narrow image 200 that may be substantially uniform in intensity. This image has a Gaussian profile in the narrow direction and a flat topped intensity profile in the long direction, i.e., the intensity measured along the long direction of the image is essentially flat in the center (i.e., at and around the vicinity of optical axis A1) and then drops off sharply at some distance from the optical axis A1. The P- and S-polarization directions are indicated by "P" and "S", respectively.

Radiation beam 20 irradiates substrate surface 12 by forming thereon a long narrow image 200. Axis A1 forms an incident angle θ relative to surface normal N12. In a preferred embodiment, surface incidence angle θ is at or near the Brewster angle for the substrate. For a silicon substrate and a 10.6 micron wavelength, the Brewster angle is about 75°. In an example embodiment, image 200 is in the form of a line image having opposite ends 202. For optimum performance, the length of such an image may be aligned with the beam direction. Movement of stage 180 via the programmed direction of controller 190 via signals S180 causes substrate surface 12 to be scanned under image 200 along a scan path 210 (introduced and discussed below in connection with FIGS. 4-7).

Figure 3:
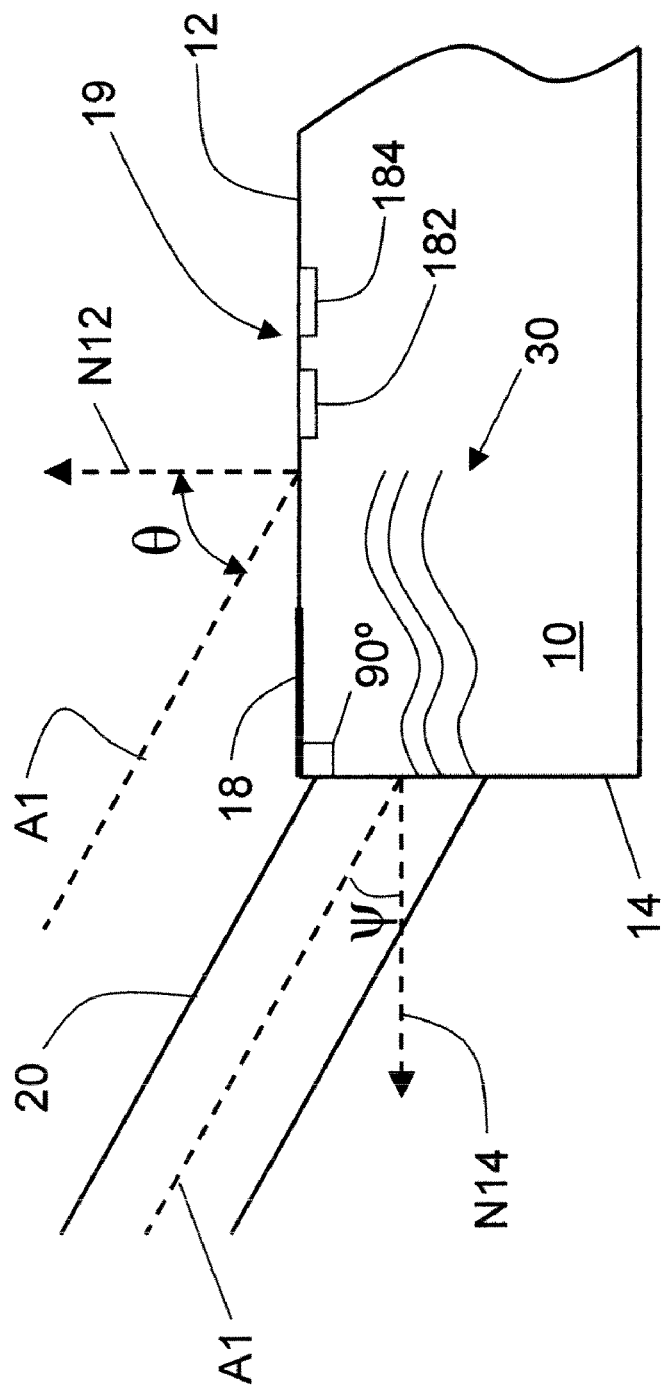
FIG. 3 is a close-up side view of the substrate edge of FIG. 1, illustrating how the radiation beam is incident upon the substrate edge at an edge incident angle ψ, and also showing damaged regions created in the substrate edge surface.

Notably, FIG. 3 depicts a scan geometry in which an image is generated on region of surface 12 that includes an edge 14. This location will be arbitrarily called the near edge. It should be evident, however, that image 200 may easily be repositioned to the far side of surface 12 by moving the substrate in the −X direction or by moving beam 20 and/or substrate 10 in the +X direction and in this case the beam would not be directly incident on the edge. Thus the near side edge is prone to direct exposure by radiation beam 20 and not the far side edge. It is possible to arrange the scan path and/or geometry of image 200 in such a way to avoid damaging the substrate edge with powerful radiation beam 20.

Line image 200 has an intensity profile that drops from a relatively constant value of 100% intensity at the ends of the useful length of the line image (e.g., ends 202 in FIG. 2), down to an intensity value that will not damage the edge in a distance corresponding to the width of edge exclusion zone 18. In the specific case of a silicon wafer annealed with 10.6 micrometer radiation, radiation beam 20 is formed so the intensity of line image 200 falls to about 37% of its maximum intensity in a distance, d, that is equal to or less than the width $W_E$ of the edge exclusion zone 18.

The portion of substrate surface 12 being irradiated at any given time during the image scanning is rapidly heated to a high temperature (e.g. 1350° C.) and then rapidly cooled to a background temperature (e.g., 400° C.) as the image 100 moves away. The amount of time that image 200 spends over any given point on substrate surface 12 is called the "dwell time" denoted herein as $t_D$, and is typically on the order of milliseconds or less.

Analysis of Substrate Edge Damage from Radiation Beam Scanning

As discussed above, radiation beam 20 is incident upon substrate surface 12 at an incident angle θ. If radiation beam 20 has an intensity $I=I_0$ measured at normal incidence to the radiation beam, then the intensity of radiation beam at a given incident angle θ is given by $I(\theta)=I_0 \cos\theta$. Thus, for an incident angle θ at or near the Brewster angle for silicon of about 75°, the intensity of radiation beam 20 at substrate surface 12 is ~(0.26)$I_0$, or about 74% less than that associated with a normally incident radiation beam. Accordingly, when performing LTP, this reduction in intensity is taken into account and the radiation beam is provided with a sufficiently high baseline intensity $I_0$ so irradiation of the substrate at an incident angle θ yields an intensity I(θ) sufficient to thermally process the wafer.

FIG. 3 is a close-up side view of substrate 10 illustrating radiation beam 20 incident on substrate edge 14 at an edge incident angle ψ, defined as the angle between axis A1 and the normal N14 to edge 14. Usually the angle ψ is a compound angle with respect to the X-Y-Z coordinate system, however under the special circumstance where φ is 0°, then ψ=90°−θ, assuming the angle between surface 12 and edge 14 is a right angle. In the case of a silicon substrate where the Brewster angle is 75°, the incident angle ψ on the edge is 15° for the special case φ=0°. At this incident angle and polar angle, the intensity incident upon substrate edge 14 as compared to the intensity incident the substrate surface is:

$$I(\psi)/I(\theta)=I_0 \cos(15°)/I_0 \cos(75°)=0.966/0.256=3.73 \quad (1)$$

Experiments have shown that this increased intensity level damages the substrate at edge 14. e.g., forms fractures 30. The ratio of the edge temperature to the surface temperature not only depends on the intensity ratio defined in equation (1), but also on the proportion of the incident energy that is absorbed in both cases. Assuming the incident beam is P-polarized with respect to the top surface of the substrate and incident at the Brewster angle then virtually all of the radiation incident on the top surface is absorbed. However, only about 71% of the P-polarized radiation incident on the edge is transmitted into the substrate, since the beam is incident at 15°. Thus the ratio between the absorbed intensity at the edge and at the top surface is about 2.66 for the case φ=0. Clearly this ratio will vary depending on the polar angle φ. have shown that edge damage can be eliminated by keeping the temperature produced by the radiation beam incident upon on the substrate edge at or below the temperature produced by the beam upon the substrate surface.

Scan Path Geometry

Figure 4:
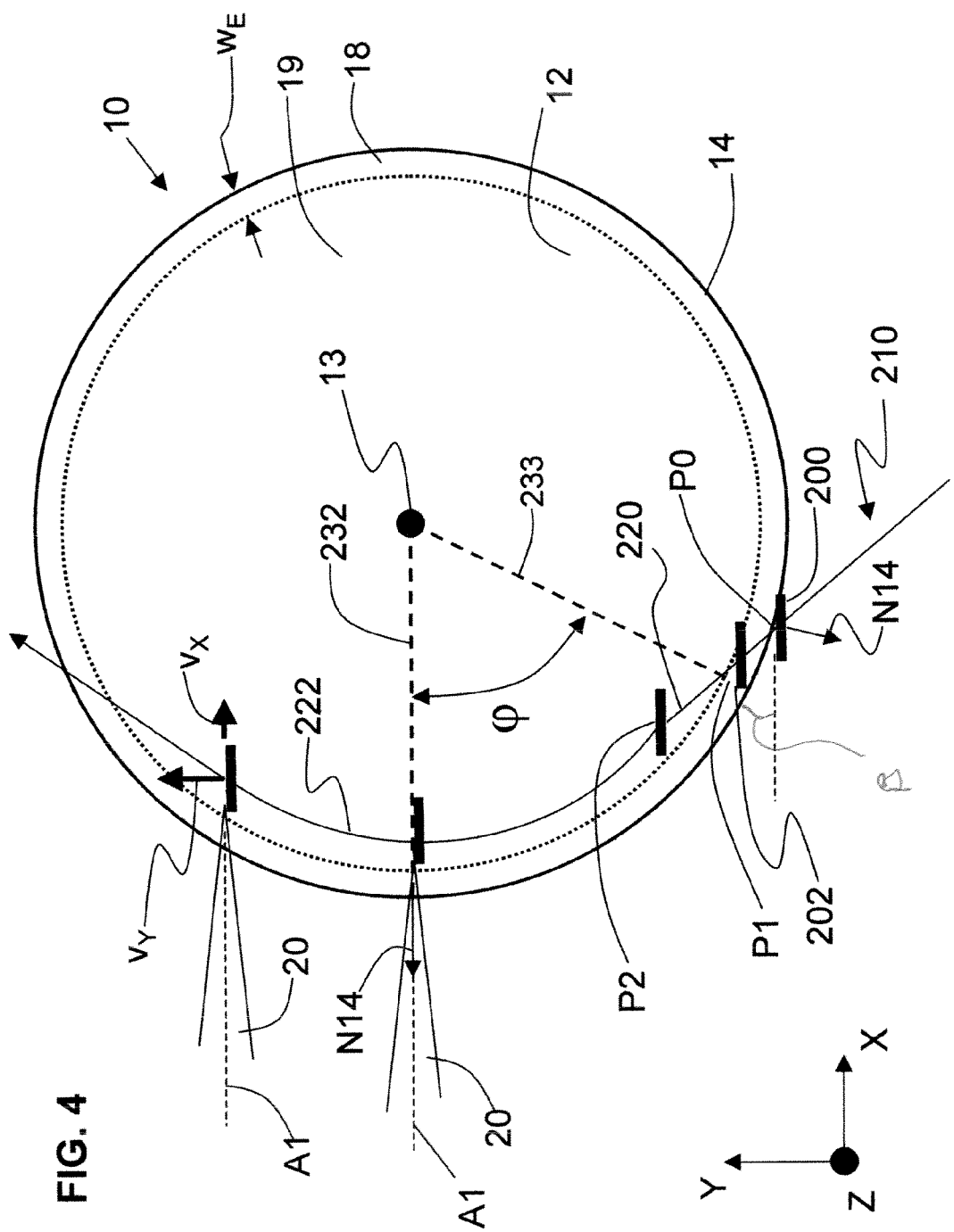
FIG. 4 is a plan view of the substrate surface and the initial section of an arcuate scan path for the line image created by the LTP apparatus of FIG. 2, showing the transition points where the line image first crosses the substrate edge (point P0), where the line image is just fully within the substrate edge (point P1), and where the end of the line image begins to follow the exclusion zone boundary (point P2).

FIG. 4 is a plan view of substrate 10 being irradiated by radiation beam 20 using a scan geometry similar to that shown in FIGS. 2 and 3 over a scan path 210 traversed by image 200. In this view the scan path starts below PO off of surface 12 and progresses to the position PO where the edge of the line image just intercepts the substrate edge and then progresses along a linear path to positions P1 and P2. X-Y-Z coordinates are shown in FIG. 4 for reference. Line image 200 formed by radiation beam 20 is first incident upon substrate edge 14 at an initial point P0 via a first scan path transition segment 220, which in an example embodiment is linear. Line image 200 continues along (linear) scan path transition segment 220 and transitions from the edge 14 to completely within the substrate upper surface at a first transition point P1. Transition point P1 defines a polar angle φ, which is measured relative to reference line 232, which is parallel to axis A1 projected on the X-Y plane, and passes through center 13 of substrate 10, and a line 233 connecting center 13 to line image edge 202 at point P1. When image end 202 transitions across the exclusion zone and first falls entirely within process area within central region 19 at a second transition point P2, then scan path 200 starts to follow a new (e.g., arcuate) scan path segment 222 that is collinear with or tangential to the linear scan path segment 220 at point P2. Thus, the point P2 is where the scan path transition from the edge exclusion zone 18 into the process area within central region 19 of substrate surface 12 is complete and where the path changes to an arcuate path having a radius equal to the exclusion edge boundary.

To prevent edge damage during irradiation of the substrate, it is necessary that the polar angle φ associated with the transition of line image 200 over substrate edge 14 be greater than or equal to a critical angle $φ_c$, which is defined as the angle where the edge temperature and the top surface temperature due to irradiating the substrate with line image 200 are equal.

In an example embodiment, transition scan path segment 220 that connects to the arcuate portion 222 is linear up to point P2 and then transitions into an arcuate scan path 220 that has a radius equal to the exclusion zone radius. The transition scan path segment 220 and the arcuate scan paths 222 are collinear at the transition point P2. Also, in this example embodiment, it is assumed that the laser power is held constant over the entire scan path 210 and that the Y-direction component of the scan velocity is constant. This yields a fixed dwell time and a constant maximum annealing temperature. Under these conditions the point where edge damage is most likely to occur along the scan path is at point P1, which corresponds to scan path angle φ.

The analysis set forth below, is an example of how the critical scan path angle φ might be calculated for a substrate 10 of silicon, and for a wavelength of radiation beam 20 of 10.6 micrometers. This calculation yields a SPC angle $φ_C$=57°. If scan path 210 is arranged so the edge crossing position φ is equal to or larger than the SPC angle $φ_C$ of 57°, then the temperature of substrate edge 14 will be maintained at a temperature equal to or less than that of substrate upper surface 12. This, in turn, will greatly reduce the chances of radiation beam 20 causing substrate edge damage 30. Other substrate materials have different indices of refraction, and therefore a different Brewster angle and a different SPC angle $φ_C$.

Edge Temperature Analysis

To estimate the maximum temperature produced on substrate edge 14 relative to that produced on substrate surface 12, it is necessary to estimate the proportion of energy absorbed per unit image length in the direction of the line image on the edge versus that on the surface.

The incident angle ψ of radiation beam 20 with respect to substrate edge normal N14 (FIG. 2) varies with polar angle φ and may be calculated by calculating an angle β defined as the apparent angle between the radiation beam and the upper surface viewed in the direction of the edge normal:

$$β = \text{Arctan}(1/\text{Tan } θ \text{ Sin } φ) \quad (2)$$

Having computed the intermediate angle β, then the compound angle ψ between the edge normal and the radiation beam is given by:

$$ψ = \text{Arctan}(\text{Tan } φ/\text{Cos } β) \quad (3)$$

Figure 5:
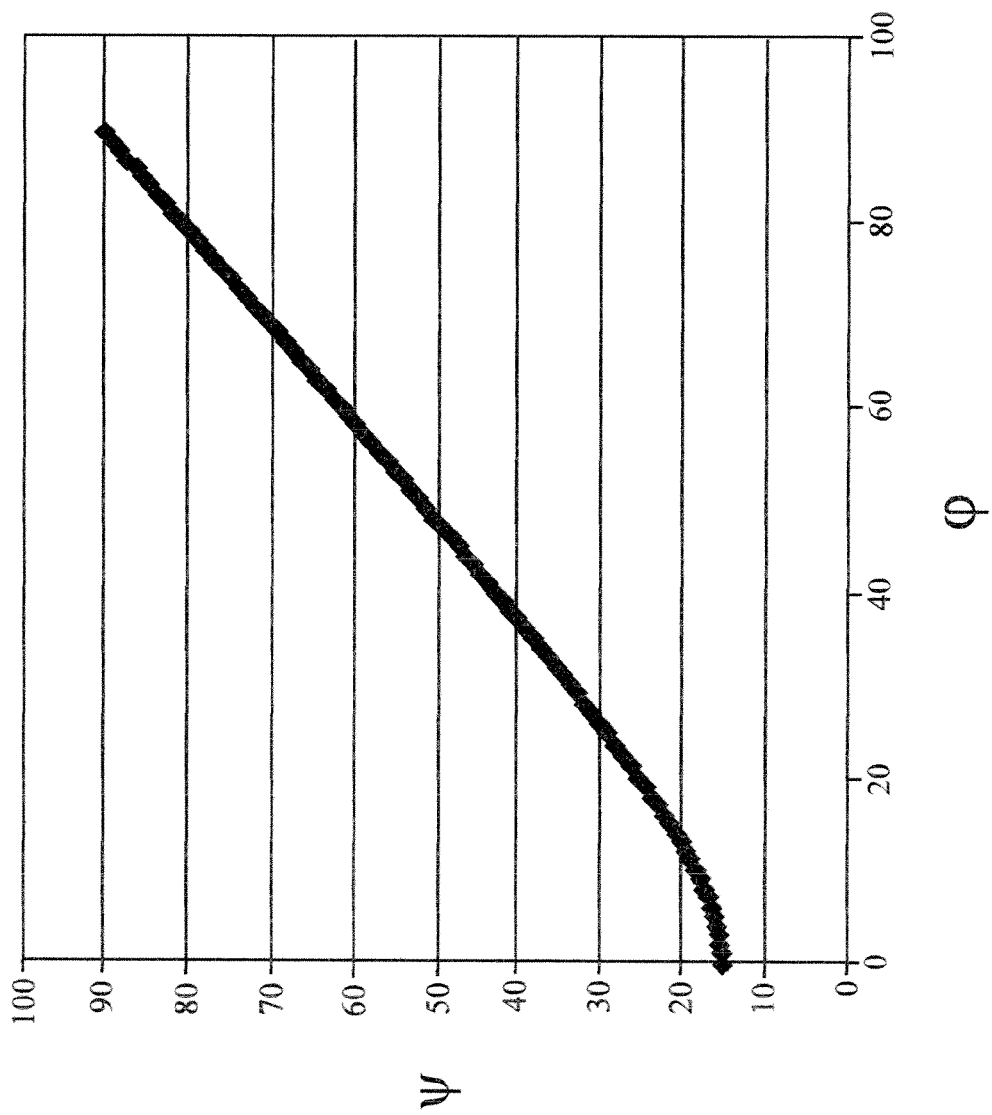
FIG. 5 is a plot of the radiation beam incident angle ψ on the wafer edge as a function of the polar φ.

Equation (3) is plotted in FIG. 5, with surface incident angle θ is assumed to be a constant at 75°, which is approximately the Brewster angle for a silicon substrate. Note that in the plot of FIG. 5, as the polar angle φ approaches 90°, the compound angle ψ between the edge normal and the radiation beam approaches φ.

Radiation beam 20 will typically have S and P polarization components with respect to the edge geometry, which are a function of the polar angle φ. Accordingly, it is necessary to compute the relative amplitude of the electric field in the planes corresponding to the P and S polarization planes for radiation beam 20 as a function of polar angle φ. Next the absorption coefficients corresponding to the S and P directions for the angle of incidence corresponding to a specific edge location are computed. Finally, the relative radiation beam powers and the absorption coefficients in the P and S planes are combined to yield the absorbed power.

Figure 6:
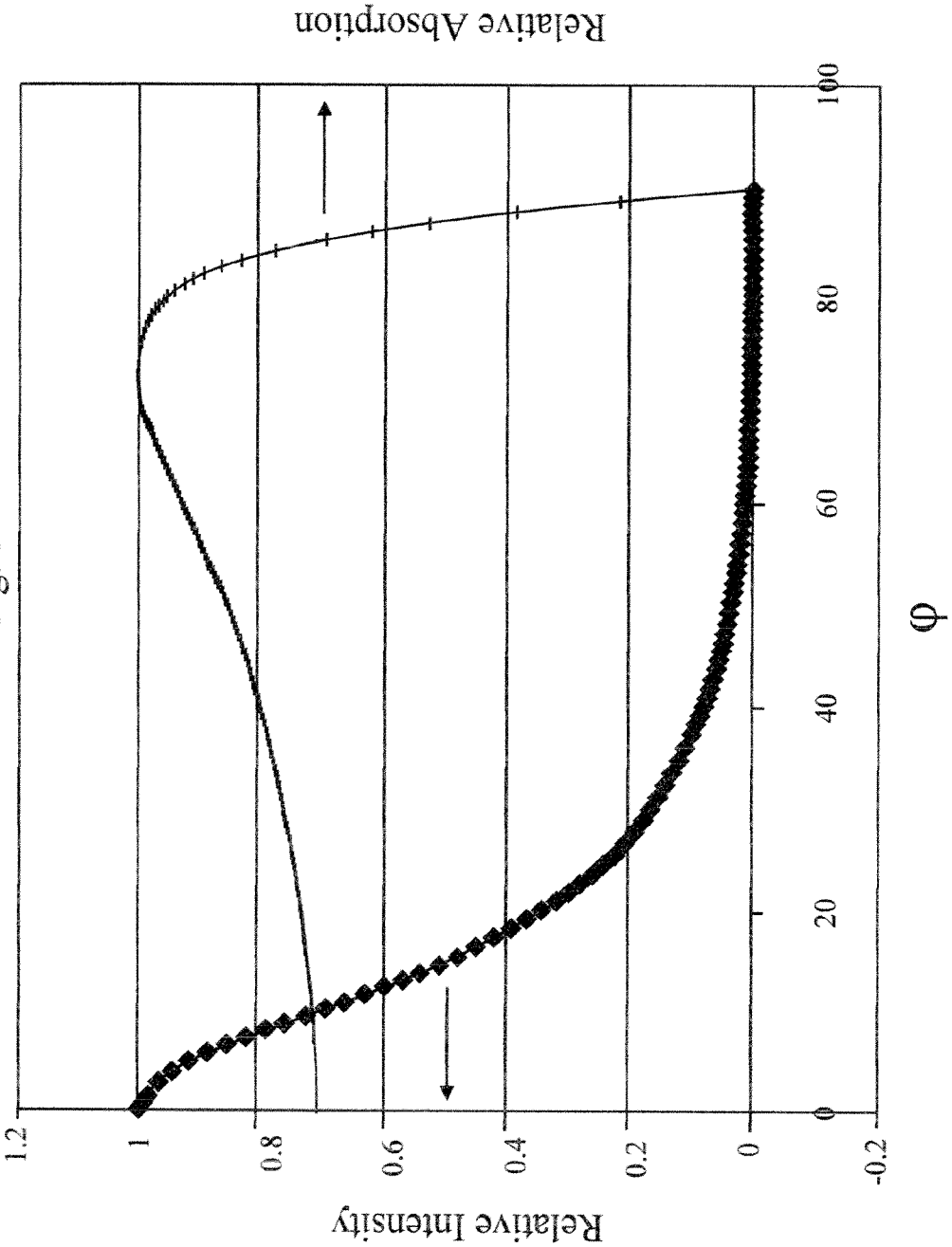
FIG. 6 is a plot showing both the relative intensity of the P-polarization component on the wafer edge and the absorption coefficient of the P-polarization component as a function of the polar angle φ.
Figure 7:
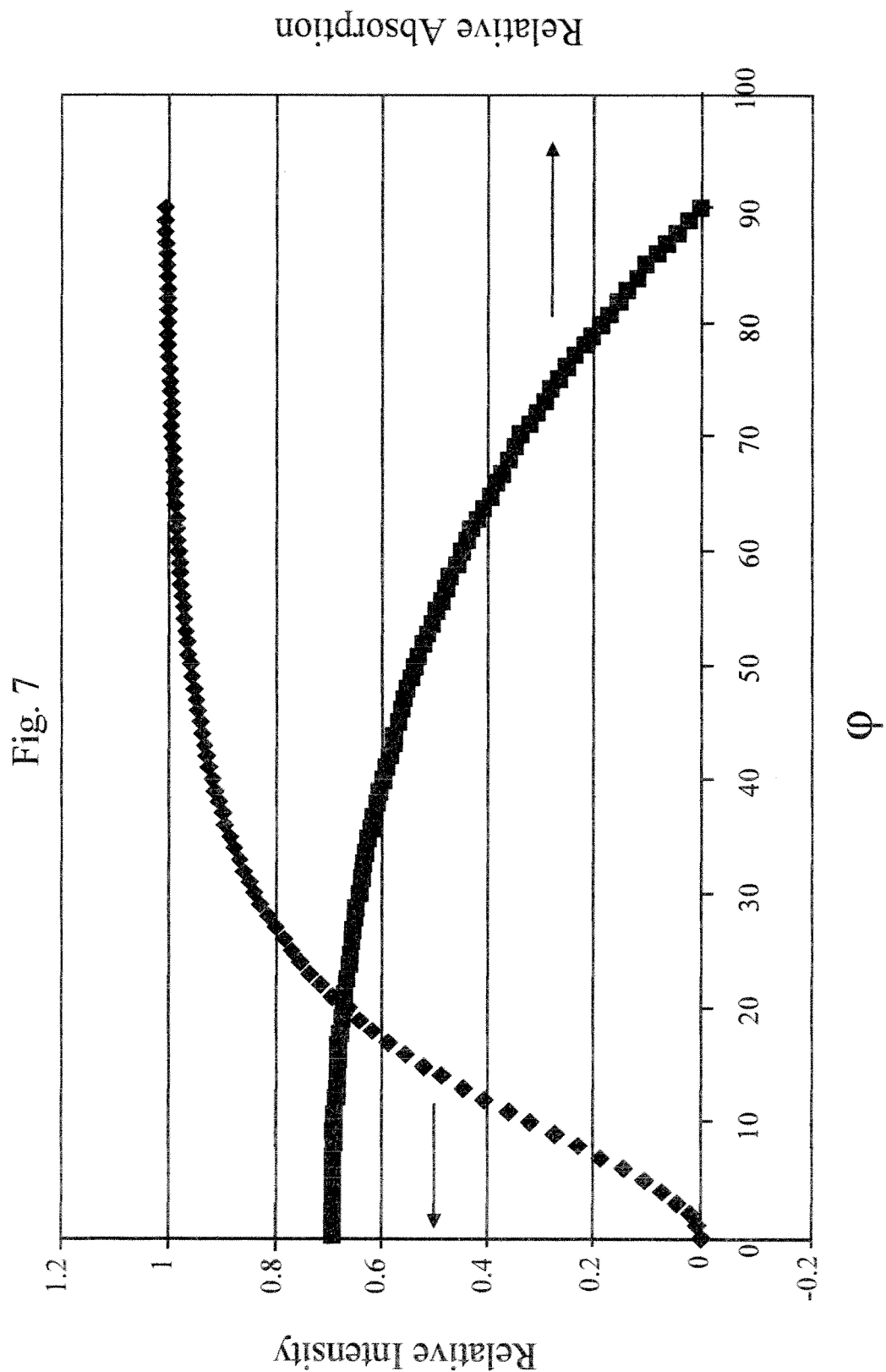
FIG. 7 is a plot showing both the relative intensity of the S-polarization component on the wafer edge and the absorption coefficient of the S-polarization component as a function of the polar angle φ.

FIGS. 6 and 7 are plots of the relative P and S power levels and the corresponding absorption coefficients for the P and S polarization directions, respectively, as a function of polar angle φ for radiation beam 20, according to equations (4) and (5) below.

Assuming the radiation beam incident on the upper surface is P-polarized, then the amplitude of the electric field vector in the P-plane, i.e. the plane containing the beam direction vector and the normal to the wafer edge corresponding to polar angle, φ is given by:

$$E_p = \text{Cos } θ \text{ Cos } φ/\text{Sin } ψ \quad (4)$$

Similarly, the amplitude of the electric vector in the S-plane, i.e. the plane containing the beam direction vector and which is normal to the p-plane, $E_s$ is given by:

$$E_s = (1-E_p^2)^{1/2} \quad (5)$$

The relative intensity corresponds to the square of the amplitude of the electric vector, thus the relative intensity $I_p$ and the relative intensity $I_s$ are given by:

$$I_p = E_p^2 \quad (6)$$

$$I_s = E_s^2 \quad (7)$$

The absorption coefficients of the P- and S polarization components are best defined by reference to an angle $ψ_1$ defined as:

$$ψ_1 = \text{Arcsin}((\text{Sin } ψ)/n) \quad (8)$$

where n is the index of refraction at the wavelength employed in the radiation beam.

In the case of undoped silicon radiated at a wavelength of 10.6 micrometers the index of refraction is about 3.421.

The absorption/transmission coefficients for the p and s polarized components, $A_p$ and $A_s$ respectively, are given by:

$$A_p = 1 - (\text{Tan}(ψ-ψ_0)/\text{Tan}(ψ+ψ_0))^2 \quad (9)$$

$$A_s = 1 - (\text{Sin}(ψ-ψ_0)/\text{Sin}(ψ+ψ_0))^2 \quad (10)$$

Figure 8:
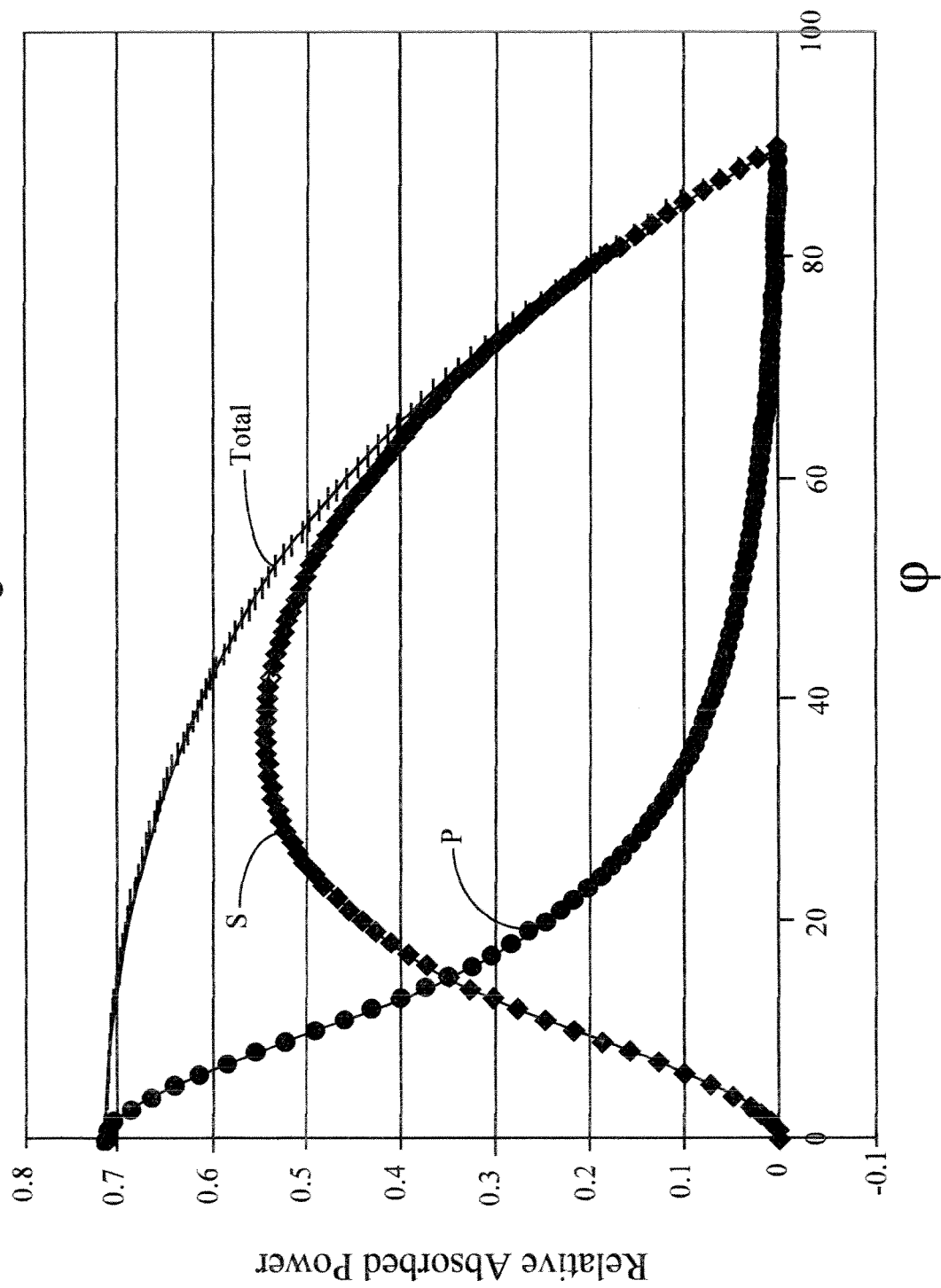
FIG. 8 is a plot of the fractional absorbed intensity of both the S- and the P-polarization components of the radiation beam incident upon the substrate edge, along with the total absorbed intensity, all as a function of the polar angle φ.

FIG. 8 is a plot of the relative amounts of absorbed intensities for the two polarization directions, $P_p$ and $P_s$ and the combined total $P_T$, all as a function of polar angle φ. These plots were made by multiplying the relative P and S intensities (equations 6 and 7) by their respective absorption coefficients (equations 9 and 10) and then adding the relative P and S absorbed intensities together to get a total.

$$P_p = I_p A_p \quad (11)$$

$$P_s = I_s A_s \quad (12)$$

$$P_T = P_p + P_s \quad (13)$$

As is evident from the plot in FIG. 8, the energy absorbed in the P-polarization component drops off rapidly as the polar angle φ increases however the energy absorbed in the S-polarization component compensates for it, so the total absorbed power declines slowly as a function of φ until φ approaches 90°.

The maximum temperature produced on the edge or on the surface is simply proportional to the product of the incident intensity, the dwell time and the absorption coefficient. Image 200 is wider on substrate edge 14 than on the surface by a factor of 1/Cos(ϕ). Also, the scanning speed relative to substrate edge 14 increases by a similar amount. Thus, the dwell time of image 200 is exactly the same for substrate edge 14 as it is for substrate surface 12. Thus to calculate the temperature ratio between the edge and the surface, we only need to multiply the ratio of their respective intensities times the ratio of their absorption coefficients $P_T$. Since the incident intensity is proportional to the cosine of the incidence angle, the ratio of the edge temperature to the surface temperature $T_R$ is given by:

$$T_R = P_T \text{Cos}(\psi)/\text{Cos}(\theta) \quad (14)$$

Figure 9:
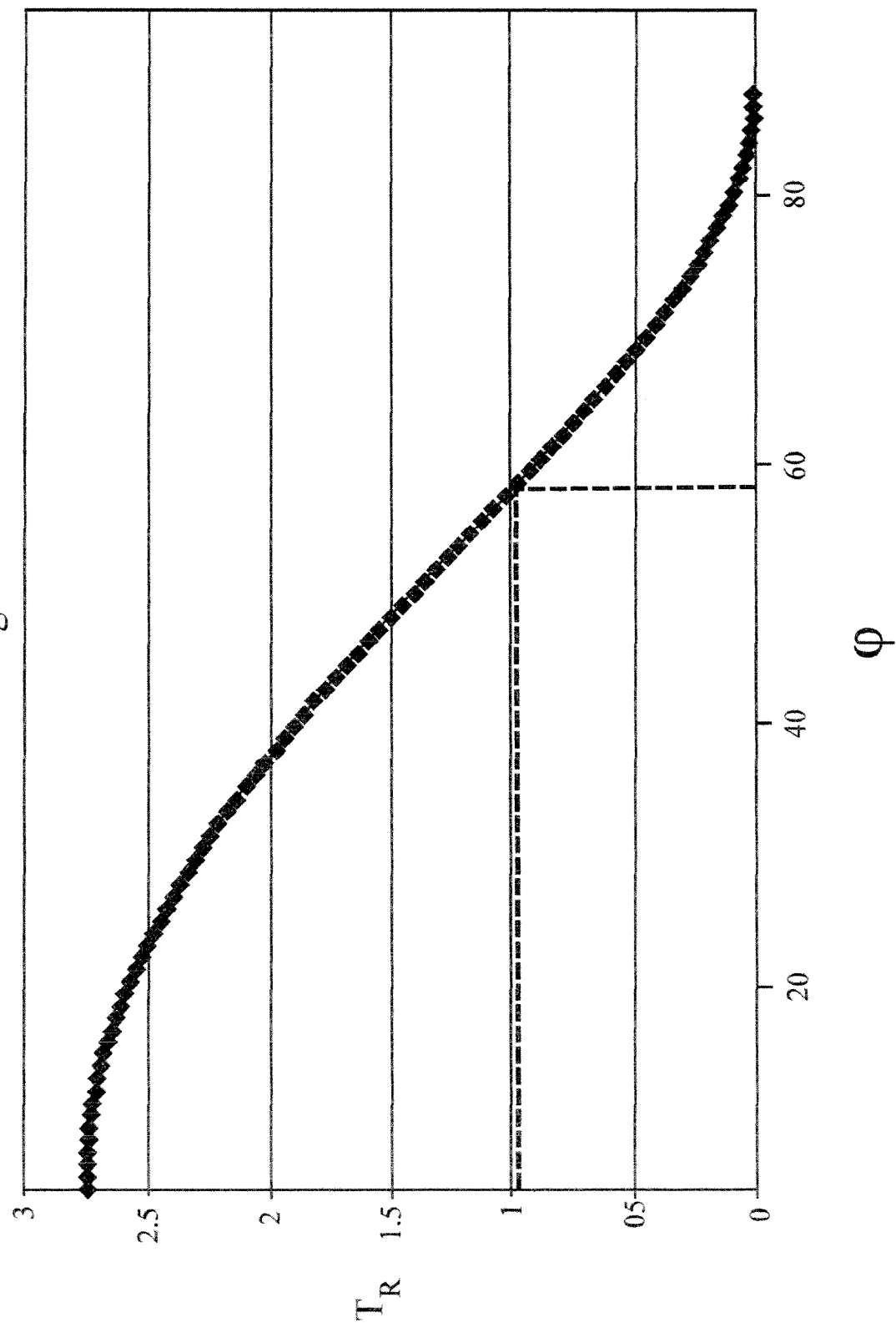
FIG. 9 is a plot of the relative temperature change $T_R$ (the ratio of the substrate edge temperature change $T_E$ as compared to the substrate surface temperature change $T_S$) due to irradiation of the substrate by the radiation beam, as a function of the polar angle φ, showing the SPC angle $φ_C$ where $T_R=1$.

FIG. 9 is a plot of the relative temperature $T_R$ as a function of the polar angle ϕ as given by equation 14. Note that from the plot of FIG. 9 as shown by the dashed lines therein, the temperature of substrate edge 14 matches that of substrate upper surface 12 at $\phi_c$=57°. This angle applies to an undoped silicon wafer radiated at a wavelength of 10.6 micrometers. Other substrate materials and other laser wavelengths would result in a different value for $\phi_c$. If the polar angle ϕ associated with the scan path meets or exceeds the SPC angle $\phi_C$, then $T_R$ will be 1 or less, and the risk of damaging the substrate edge is minimized.

Example Scan Path

One way in which substrate edge breakage may be avoided is by selecting the scan path 210 of image 200 so that radiation beam 20 is never incident on substrate edge 14 in a manner that produces a temperature greater than the temperature produced on substrate upper surface 12. This may be accomplished by making sure scan path 210 intersects the substrate edge 14 at points corresponding to a polar angle that meets or exceeds the SPC angle $\phi_C$.

Figure 10:
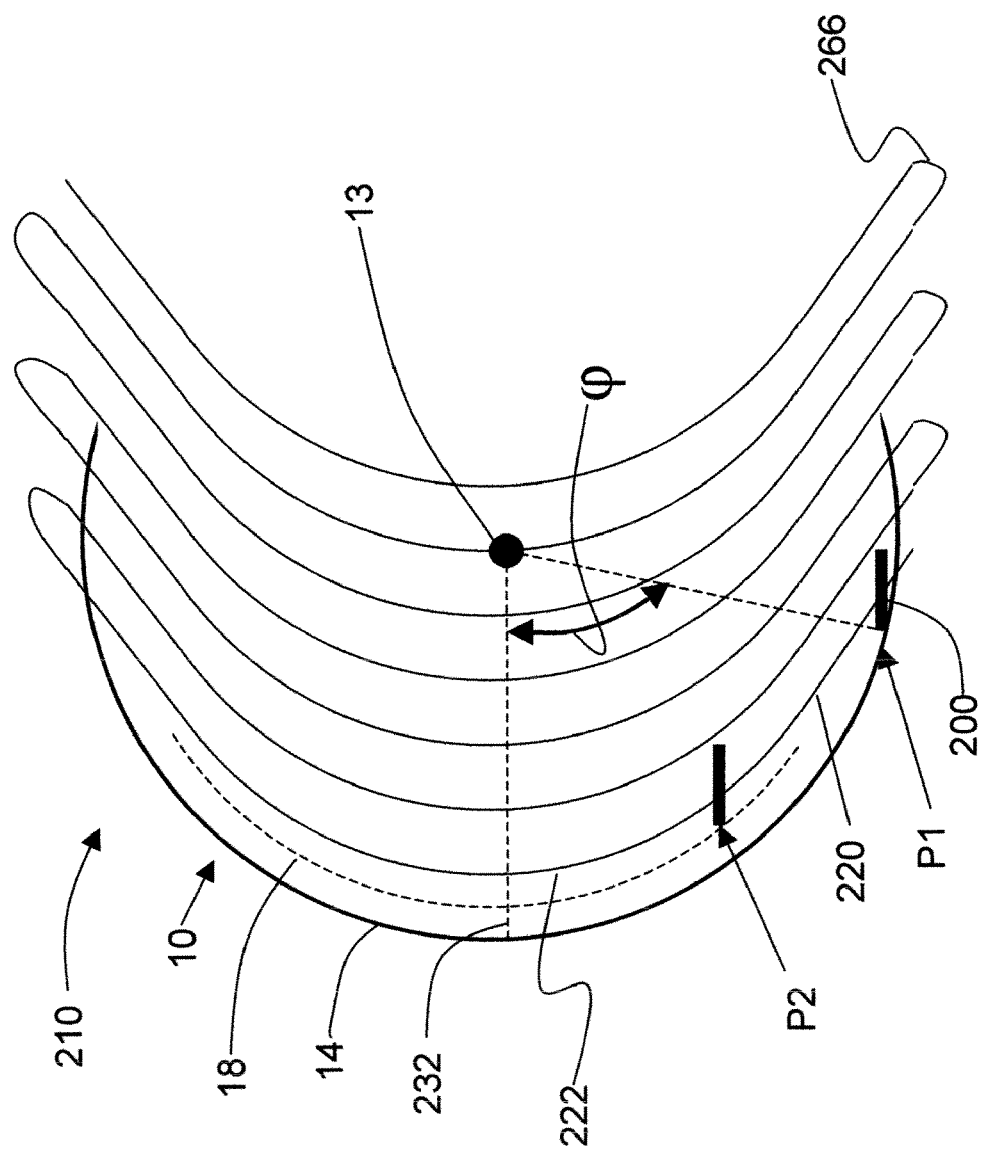
FIG. 10 is a plan view of the substrate illustrating an example embodiment of a scan path for a line image being scanned over the substrate surface, wherein the scan path includes a plurality of arcuate scan path segments coupled by respective transition segments that bring the line image off of and onto the substrate surface at polar angles that equal or exceed the SPC angle $φ_C$ so that the substrate edge temperature remains substantially at or below the substrate surface temperature.

FIG. 10 is a plan view of substrate surface 12 showing a first example embodiment of multiple scan paths 210 that all satisfy the safe scan condition. Example scan path 210 includes initial linear scan path segment 220 that brings line image 200 initially into contact with substrate 10 at point P0, and then completely onto substrate 10 at point P1, which should correspond to an angle ϕ that is equal to or larger than the SPC angle $\phi_C$. Once image 200 falls completely within substrate edge exclusion boundary 18 at transition point P2, the linear scan path segment 220 transitions to the first of a number of arcuate scan path segments 222 that follow the curvature of the inner substrate exclusion zone boundary. Adjacent arcuate scan path segments 222 have a similar shape but are laterally displaced by the length of line image 200. In this example embodiment, arcuate segments 222 each have a radius equal to the substrate radius minus the exclusion zone width $w_E$.

Figure 11:
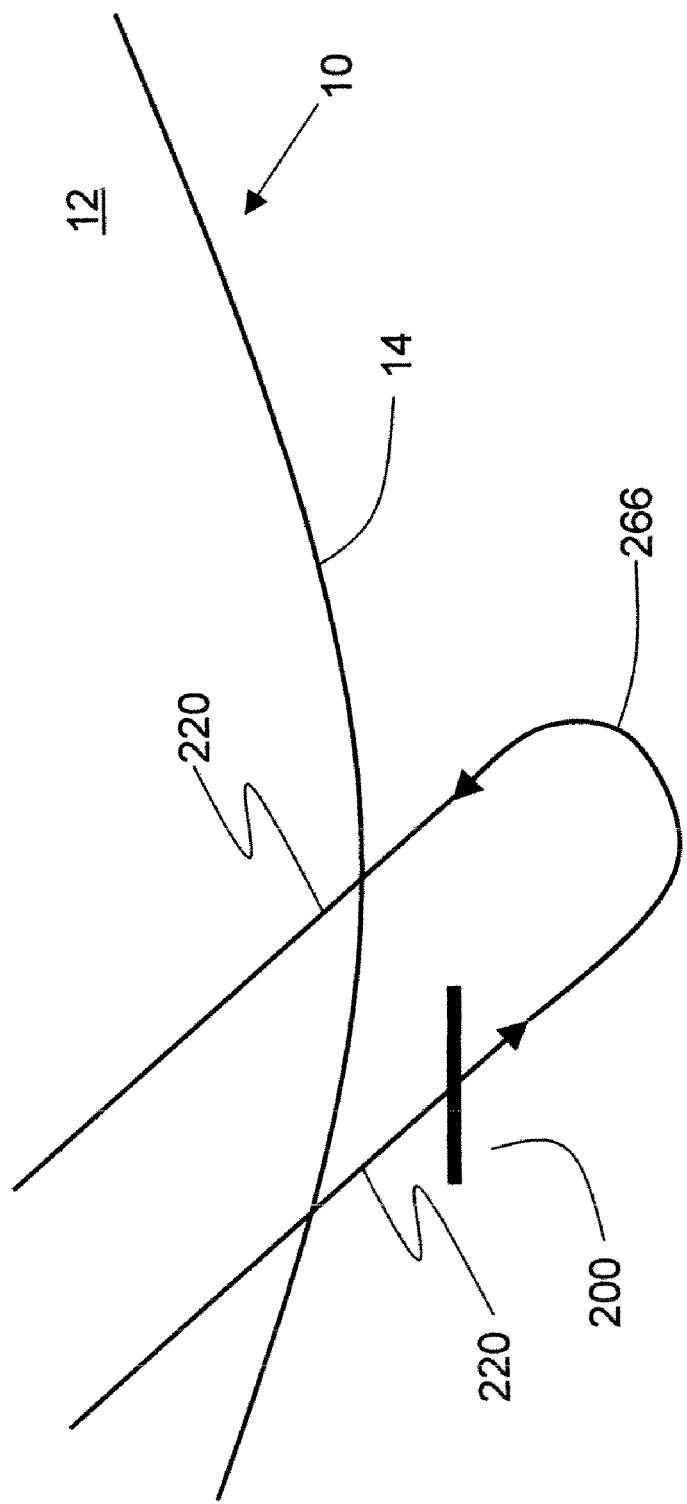
FIG. 11 is a close-up view of the scan path of FIG. 10, showing two transition scan path segments connected to a turn-around scan path segment near the edge of the substrate.

Arcuate scan path segments 222 are connected to transition scan path segments 210 where the image travels off of and back onto the substrate. Adjacent transition scan path segments 220 are connected via a turn-around segment 266. FIG. 11 is a close-up view of a portion of scan path 220 near the edge of the substrate illustrating two transition segments connected by a turn-around segment. Turn-around segments 266 are located away from the substrate edge and off of surface 12 so image 200 does not fall on the substrate surface during the transition between adjacent scan segments when the scanning velocity changes substantially. The turn-around segments 266 have to be long enough so that the stage velocity can be reversed and brought up to the required speed before the line image touches the substrate edge.

In an example embodiment, controller 190 is programmed to move stage 180 via control signals S180 to cause substrate 10 to follow scan path 210, such as the example scan path 210 illustrated in FIG. 10. The result is that the entire substrate surface 12 is thermally processed with radiation beam 20 with the exception of the portion of wafer lying between the edge and the inner exclusion boundary and between the polar angle extremes of ±ϕ. This procedure requires, among other things, coordinated motion in the X and Y scanning axis of stage 180 to produce an arcuate scan path. The positions where transition path segments 220 cross substrate edge 14 are chosen so that the corresponding minimum polar angle at which radiation beam 20 strikes substrate edge 14 satisfies the safe scan condition and no damage occurs to the substrate edge.

Substrate Rotation

Another way in which substrate edge breakage may be avoided is by selecting a scanning geometry providing a scan path 210 of image 200 that does not allow radiation beam 20 to illuminate directly any portion of the edge 14. This may be achieved, for example, by ensuring that the scan path crosses the substrate edge only where the edge normal is pointing in the beam direction or is normal to the beam direction or somewhere in between. This assures that the beam is not directly incident on an edge. Such a scan path may be used to process a substrate surface in its substantial entirety by exposing as much of the substrate as possible in one orientation and then rotating the substrate relative to the beam before exposing the remainder of the substrate.

FIG. 12 shows a scanning geometry and path for an image scanned across a substrate surface in a manner that ensures that no portion of a substrate's edge is directly illuminated by any portion of the image. As shown in FIGS. 12A and 12C, a LTP system 100 similar to that shown in FIG. 2 may be used to process substrate 10. Optionally, as shown in FIG. 12B the substrate may have a surface 12 that is separated by dotted line H into arbitrarily named far side region 12D and near side region 12P. In FIG. 12B, a radiation beam image 200 is raster scanned over the far side FS of the substrate at an incident angle θ relative to surface normal N12 to expose this half of the substrate. As shown, the incident angle θ is at or near about 75°. However, the any incident angle greater than 45° may be employed where the incident angle is contained in a plane normal to the substrate and containing the lengthwise axis of the image.

Figure 12A:
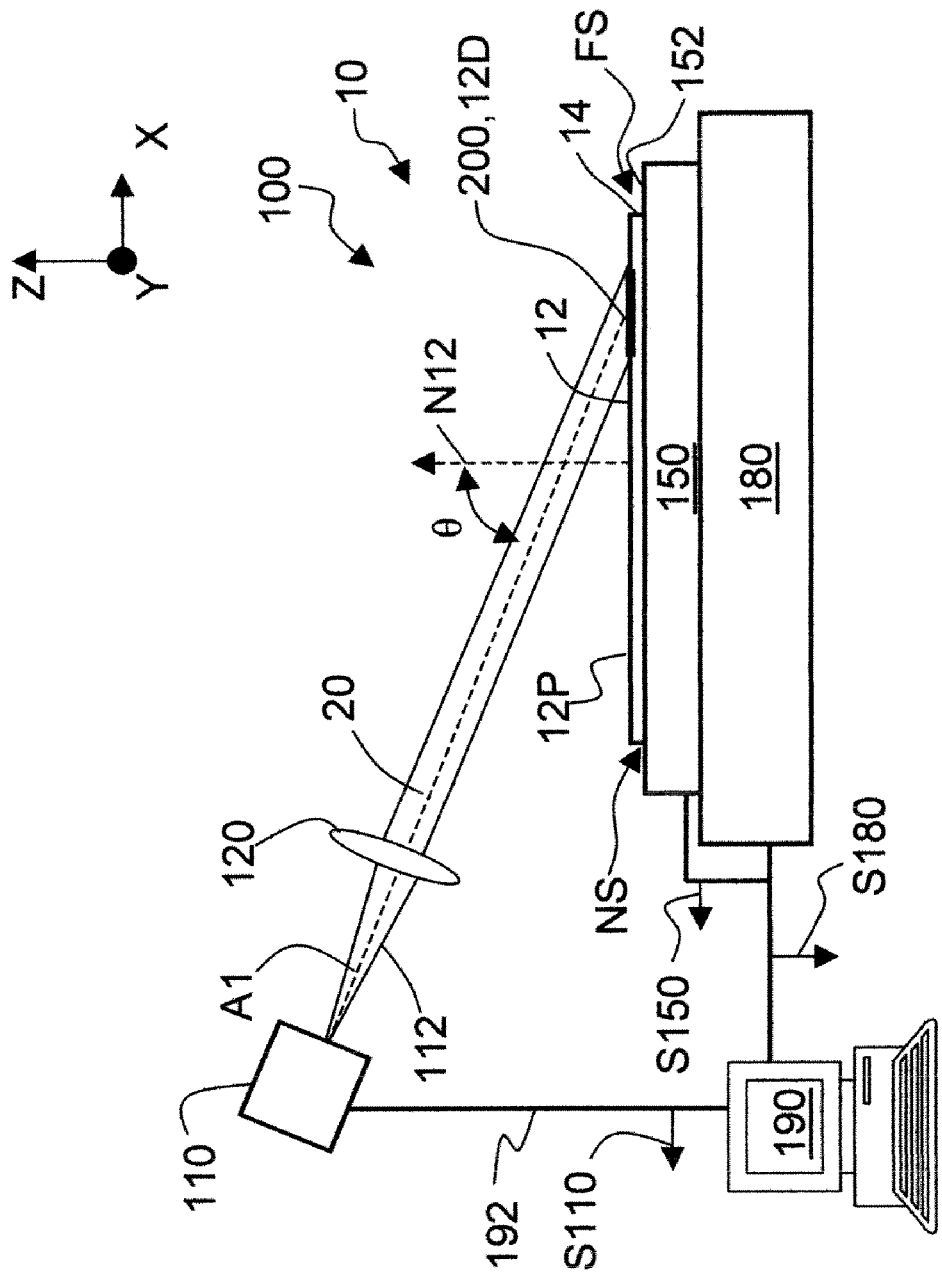
FIGS. 12A-12D, collectively referred to as FIG. 12, depicts a scanning geometry and path for an image scanned across a substrate surface in a manner that ensures that no portion of a substrate's edge is directly illuminated by any portion of the image.
Figure 12B:
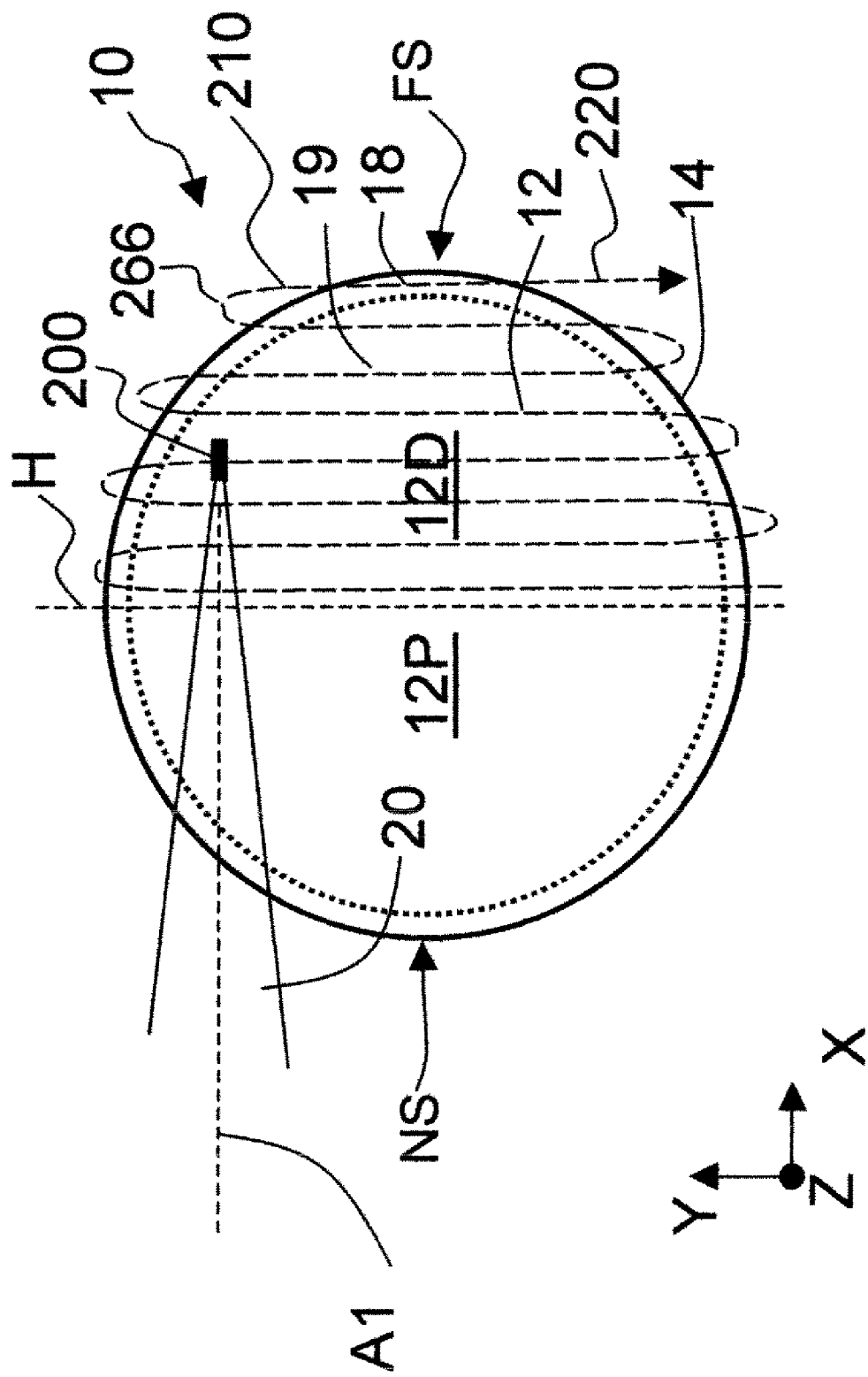

Movement of stage 180 via the programmed direction of controller 190 via signals S180 causes the far side 12D of substrate surface 12 to be scanned under image 200 along a scan path 210. The image 200 scanned across the distal region 12D may be formed from a beam 200 traveling over at least a portion of the central region 19. As shown in FIG. 12B, linear scan path segments 220 are connected to turnaround scan path segments 266. The turn-around segments 266 are located away from the substrate edge and off of surface 12 so image 200 does not fall on the substrate surface during the transition between adjacent scan segments when the scanning velocity changes substantially. Further optionally, the near side region 12P of substrate surface is not scanned while the beam approaches from a direction that corresponds to the near side NS of the substrate.

Typically, the image 200 is scanned across at least the periphery region 18 located in the far side region 12D of the substrate surface 12 in a manner effective to process the substrate 10 at a substantially uniform temperature without overheating the outer edge to a temperature that damages the edge. As shown in FIG. 12B, the scan path covers the far side region 12D in a manner so as to allow the image 200 to be scanned across substantially the entirety of distal surface region 12D so as to allow for thermal processing any desired region (e.g., source or drain) of the substrate. Once the far side region has been scanned, either the beam direction with respect to the substrate or the orientation of the substrate 10 with respect to the beam 20 may be altered.

Figure 12C:
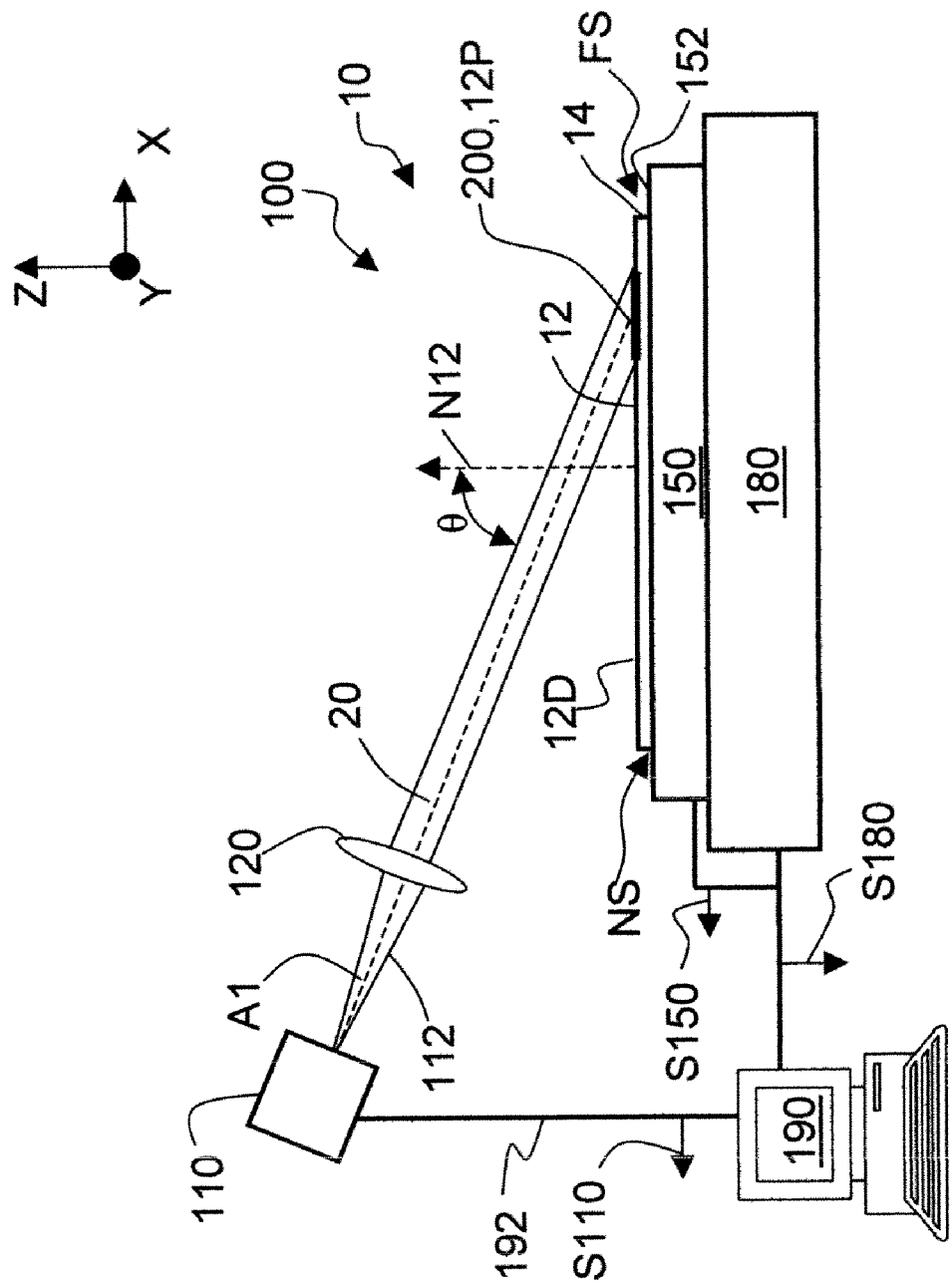

In FIG. 12C, the radiation beam 20 continues to irradiate substrate surface 12 from at a 75° incident angle θ relative to surface normal N12. However, the substrate has been rotated 180° about surface normal N12. Accordingly, the relative positions of the near surface region 12P and the far surface region 12D are interchanged. As a result, an image 200 is formed on the formerly near region 12P of surface 12 adjacent to edge 14 now on the far side FS of the substrate 10.

Figure 12D:
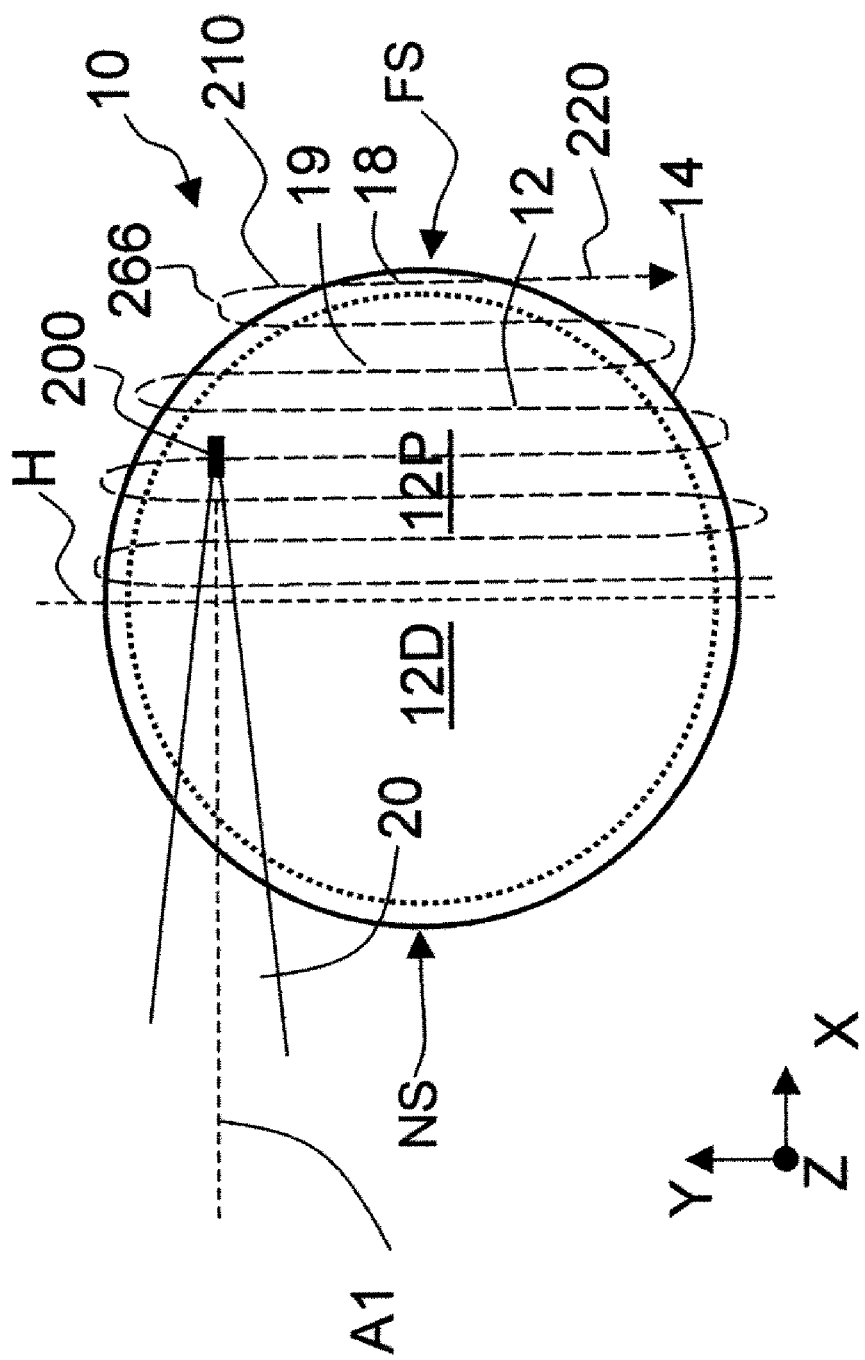

Movement of stage 180 via the programmed direction of controller 190 via signals S180 continues to cause substrate surface 12 to be scanned under image 200 along a scan path 210. Again, the image 200 scanned across the formerly near region 12P may be formed from a beam 200 traveling over at least a portion of the central region 19. As shown in FIG. 12D, the scan path on the formerly near region 12P is similar to that shown in FIG. 12B. As a result, substantially the entire substrate surface 12 may be thermally processed with radiation beam 20.

Figure 13:
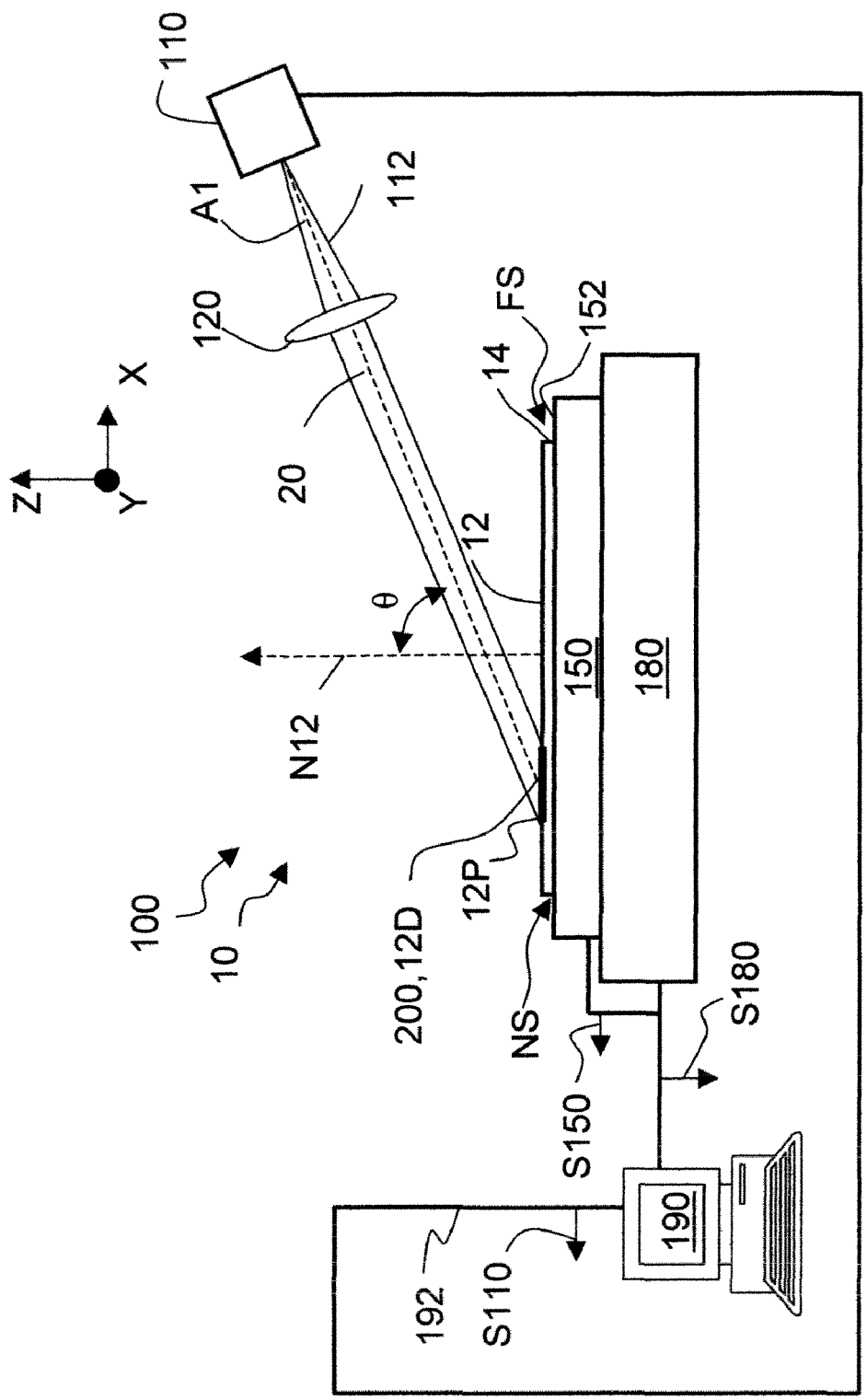
FIG. 13 depicts an scanning geometry similar to that shown in FIG. 12 A with the relative position of the beam and the substrate having been changed to alter the direction of beam's approach relative to the substrate.

Substantially the entire substrate may be thermally processed without wafer rotation as well. Instead of rotating the wafer, the beam may be repositioned to alter its direction. That is, the beam may be redirected, as shown in FIG. 13, so it approaches the substrate from the far side FS of the substrate.

In the foregoing description of the invention, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Any aspects of the invention discussed herein may be included or excluded as appropriate. Accordingly, other embodiments are within the scope of the appended claims.

All patent applications referred to herein are incorporated by reference in their entireties to the extent consistent with the above.

What is claimed is:

1. An apparatus for processing a substrate having an upper surface that includes a central region and a narrow annular peripheral region therearound, and said substrate has an outer edge perpendicular to the upper surface of the substrate extending downward from the narrow annular peripheral region on the upper surface, said apparatus comprising:
   a radiation source adapted to emit radiation;
   an optical system adapted to receive the emitted radiation and create therefrom a beam that forms an image that is incident the upper surface of the substrate at an incident angle greater than 45°;
   a moveable stage adapted to support the substrate; and
   a controller operably coupled to the radiation source and the stage, wherein the controller is programmed to provide relative movement between the stage and the beam to scan the image on to, across and off of the substrate surface as necessary in selected scan paths in a manner effective to process the upper surface of the substrate over at least the central region at a substantially uniform temperature without heating the outer edge at and above a critical temperature at which damage occurs to the outer edge.

2. The apparatus of claim 1, further comprising a substrate supported by the stage, wherein the incident angle between the beam and the upper surface of the substrate is at or near the Brewster angle.

3. The apparatus of claim 2, wherein the substrate comprises Si.

4. The apparatus of claim 2, wherein the outer edge is curved.

5. The apparatus of claim 2, wherein the stage is transversely and rotationally movable.

6. The apparatus of claim 5, wherein the stage is rotational through at least 180°.

7. The apparatus of claim 5, wherein the controller is programmed to orient the stage so that the substrate is rotated about an axis normal to the upper surface thereof.

8. The apparatus of claim 7, wherein the controller is programmed to ensure that the image is scanned across the narrow annular peripheral region of the surface.

9. The apparatus of claim 2, wherein the controller is programmed to move the stage in a manner effective to ensure that no portion of the image directly illuminates any portion of the outer edge.

10. The apparatus of claim 2, wherein the controller is programmed to ensure that substantially all of the upper surface of the substrate is thermally processed.

11. The apparatus of claim 1 where in the narrow annular peripheral region has a selected width and the image is a line image having a length that is greater than the selected width of the narrow annular peripheral region.

12. A method for processing a substrate having an upper surface that includes a central region and a narrow annular peripheral region therearound, and said substrate has an outer edge perpendicular to the upper surface of the substrate extending downward from the narrow annular peripheral region on the upper surface, said method comprising the steps of:
   (a) forming an image from a radiation beam that is incident the upper surface of the substrate at an incident angle greater than 45°; and
   (b) scanning the image on to, across and off of the substrate as necessary in selected scan paths in a manner effective to process at least the central region of the substrate surface at a substantially uniform temperature without heating the outer edge to a critical temperature at and above which damage occurs to the outer edge.

13. The method of claim 12, further comprising the step of:
   (c) rotating the substrate through a selected angle about an axis normal to the upper surface thereof.

14. The method of claim 13, wherein step (c) is carried out after a selected portion of the upper surface of the substrate is thermally processed.

15. The method of claim 13, wherein step (c) is carried out while step (b) is carried out.

16. The method of claim 11, wherein step (b) scans the image across substantially all of the upper surface of the substrate.

17. The method of claim 12, wherein step (b) is carried out in a manner effective to ensure that no portion of the image directly illuminates any portion of the outer edge.

18. A method for processing a substrate having an upper surface divided into first and second regions and an outer edge extending downward perpendicularly from the upper surface and therearound, said method comprising the steps of:

(a) forming an image on to, across and off of the first region as necessary in selected scan paths from a radiation beam that extends above and across the second region and is then incident the upper surface of the first region of the substrate at a selected incident angle;

(b) scanning the image across the first region;

(c) orienting the substrate and/or the radiation beam so the relative positions of the first and the second regions of the upper surface are transposed relative to the radiation beam;

(d) forming an image on to, across and off of the second region as necessary from a radiation beam that extends above and across the first region and is then incident the upper surface of the second region of the substrate at the selected incident angle; and (e) scanning the image across the second region, wherein steps (b) and (e) are carried out in a manner effective to process the upper surface of the substrate at a substantially uniform temperature without heating the outer edge of the substrate to a critical temperature at and above which damage occurs to the outer edge of the substrate.

19. The method of claim 18, wherein the incident angle is about 75°.

20. The method of claim 18, wherein steps (b) and (e) scan the image across substantially all of the upper surface of the substrate.

21. The method of claim 18, wherein each of said first and second regions are each substantially one-half of the upper surface of the substrate with steps (b) and (e) scanning the image across substantially all of the upper surface of the substrate without the scanned image irradiating any portion of the outer edge of the substrate.

22. The method of claim 18, wherein the incident angle is greater than 45°.

* * * * *